United States Patent
Montrone

(10) Patent No.: US 10,628,776 B2
(45) Date of Patent: Apr. 21, 2020

(54) SYSTEM AND METHOD FOR CALCULATING A PRODUCTIVITY OF AN INDUSTRIAL INSTALLATION

(71) Applicant: Siemens Aktiengesellschaft, München (DE)

(72) Inventor: Francesco Montrone, Riemerling (DE)

(73) Assignee: SIEMENS AKTIENGESELLSCHAFT (DE)

(*) Notice: Subject to any disclaimer, the term of this patent is extended or adjusted under 35 U.S.C. 154(b) by 400 days.

(21) Appl. No.: 15/309,524

(22) PCT Filed: Jun. 27, 2014

(86) PCT No.: PCT/EP2014/063710
§ 371 (c)(1),
(2) Date: Nov. 8, 2016

(87) PCT Pub. No.: WO2015/197134
PCT Pub. Date: Dec. 30, 2015

(65) Prior Publication Data
US 2017/0161654 A1   Jun. 8, 2017

(51) Int. Cl.
*G06Q 10/06* (2012.01)
*G06Q 10/10* (2012.01)

(52) U.S. Cl.
CPC ........... *G06Q 10/067* (2013.01); *G06Q 10/06* (2013.01); *G06Q 10/0633* (2013.01); *Y02P 90/86* (2015.11)

(58) Field of Classification Search
CPC ............................. G06Q 10/06; G06Q 10/10
USPC ....................................................... 705/7.27
See application file for complete search history.

(56) References Cited

U.S. PATENT DOCUMENTS

| | | | | |
|---|---|---|---|---|
| 2009/0167763 A1* | 7/2009 | Waechter | ................ | G06T 15/06 345/426 |
| 2014/0025356 A1* | 1/2014 | Kosko | ..................... | G06F 17/10 703/2 |
| 2014/0079297 A1* | 3/2014 | Tadayon | .................. | G06K 9/00 382/118 |

FOREIGN PATENT DOCUMENTS

| | | |
|---|---|---|
| EP | 2 251 804 A2 | 11/2010 |
| WO | 0165322 A1 | 9/2001 |
| WO | 2006051076 A1 | 5/2006 |

OTHER PUBLICATIONS

International Search Report for PCT Application No. PCT/EP2014/063710, dated Mar. 12, 2015.

* cited by examiner

*Primary Examiner* — Nga B Nguyen
(74) *Attorney, Agent, or Firm* — Schmeiser, Olsen & Watts LLP

(57) ABSTRACT

A method and a system for calculating a productivity of an industrial system consisting of system modules is provided. A Markov model is stored for each system module, the Markov model indicating the probabilities that a system module is in different operating states and indicating transition rates of state changes between the operating states of the respective system module for each operating state of the respective system module with a different productivity. A Cartesian product is calculated from a first Markov model of a first system module and from a second Markov model of a second system module linked to the first system module. The calculated Cartesian product is then reduced to a Markov model of the combined sub-system. The calculation of the Cartesian product and the subsequent reduction are carried out successively until the combined sub-system forms the entire industrial system.

16 Claims, 27 Drawing Sheets

$ZZAV = \min(w_1 \cdot v, m) \cdot w_2$

| TRANSITION | RATE | COMMENT |
|---|---|---|
| (1) -> (2) | L(2*GOOD_COMP) | 100 -> 50 |
| (2) -> (3) | L(GOOD_COMP) | 50 -> 0 |
| (2) -> (1) | M(GOOD_COMP) | 50 -> 100 |
| (3) -> (2) | M(2*GOOD_COMP) | 0 -> 50 |

| TRANSITION | RATE | COMMENT |
|---|---|---|
| (1) -> (2) | L(2*BAD_COMP) | 100 -> 70 |
| (2) -> (3) | L(BAD_COMP) | 70 -> 0 |
| (2) -> (1) | M(BAD_COMP) | 70 -> 100 |
| (3) -> (2) | M(2*BAD_COMP) | 0 -> 70 |

FIG 18

| TRANSITION | RATE | COMMENT |
|---|---|---|
| (1) -> (2) | L(2*BAD_COMP) | 200 -> 170 |
| (1) -> (3) | L(2*GOOD_COMP) | 200 -> 150 |
| (2) -> (4) | L(BAD_COMP) | 170 -> 100 |
| (2) -> (5) | L(2*GOOD_COMP) | 170 -> 120 |
| (3) -> (5) | L(2*BAD_COMP) | 150 -> 120 |
| (3) -> (6) | L(GOOD_COMP) | 150 -> 100 |
| (4) -> (7) | L(2*GOOD_COMP) | 100 -> 50 |
| (5) -> (7) | L(BAD_COMP) | 120 -> 50 |
| (5) -> (8) | L(GOOD_COMP) | 120 -> 70 |
| (6) -> (8) | L(2*BAD_COMP) | 100 -> 70 |
| (7) -> (9) | L(GOOD_COMP) | 50 -> 0 |
| (8) -> (9) | L(BAD_COMP) | 70 -> 0 |
| (2) -> (1) | M(BAD_COMP) | 170 -> 200 |
| (3) -> (1) | M(GOOD_COMP) | 150 -> 200 |
| (4) -> (2) | M(2*BAD_COMP) | 100 -> 170 |
| (5) -> (2) | M(GOOD_COMP) | 120 -> 170 |
| (5) -> (3) | M(BAD_COMP) | 120 -> 150 |
| (6) -> (3) | M(2*GOOD_COMP) | 100 -> 150 |
| (7) -> (4) | M(GOOD_COMP) | 50 -> 100 |
| (7) -> (5) | M(2*BAD_COMP) | 50 -> 120 |
| (8) -> (5) | M(2*GOOD_COMP) | 70 -> 120 |
| (8) -> (6) | M(BAD_COMP) | 70 -> 100 |
| (9) -> (7) | M(2*GOOD_COMP) | 0 -> 50 |
| (9) -> (8) | M(2*BAD_COMP) | 0 -> 70 |

FIG 20

| TRANSITION | RATE | COMMENT |
|---|---|---|
| (1) -> (2) | L(2*BAD_COMP) | 200 -> 170 |
| (1) -> (3) | L(2*GOOD_COMP) | 200 -> 150 |
| (2) -> (4) | L(2*GOOD_COMP) | 170 -> 120 |
| (2) -> (8) | L(BAD_COMP) | 170 -> (10) |
| (3) -> (4) | L(2*BAD_COMP) | 150 -> 120 |
| (3) -> (8) | L(GOOD_COMP) | 150 -> (10) |
| (4) -> (5) | L(BAD_COMP) | 120 -> 50 |
| (4) -> (6) | L(GOOD_COMP) | 120 -> 70 |
| (5) -> (7) | L(GOOD_COMP) | 50 -> 0 |
| (6) -> (7) | L(BAD_COMP) | 70 -> 0 |
| (8) -> (5) | L(0.8*2*GOOD_COMP) | (10) -> 50 |
| (8) -> (6) | L(0.2*2*BAD_COMP) | (10) -> 70 |
| (2) -> (1) | M(BAD_COMP) | 170 -> 200 |
| (3) -> (1) | M(GOOD_COMP) | 150 -> 200 |
| (4) -> (2) | M(GOOD_COMP) | 120 -> 170 |
| (4) -> (3) | M(BAD_COMP) | 120 -> 150 |
| (5) -> (4) | M(2*BAD_COMP) | 50 -> 120 |
| (5) -> (8) | M(GOOD_COMP) | 50 -> 100 NEW |
| (6) -> (4) | M(2*GOOD_COMP) | 70 -> 120 |
| (6) -> (8) | M(BAD_COMP) | 70 -> 100 NEW |
| (7) -> (5) | M(2*GOOD_COMP) | 0 -> 50 |
| (7) -> (6) | M(2*BAD_COMP) | 0 -> 70 |
| (8) -> (2) | M(0.8*2*BAD_COMP) | 100 NEW -> 170 |
| (8) -> (3) | M(0.2*2*GOOD_COMP) | 100 NEW -> 150 |

FIG 22

| TRANSITION | RATE | COMMENT |
|---|---|---|
| (1) -> (2) | L(2*BAD_COMP) | 200 -> 170 |
| (1) -> (3) | L(2*GOOD_COMP) | 200 -> 150 |
| (2) -> (4) | L(2*GOOD_COMP) | 170 -> 120 |
| (2) -> (8) | L(BAD_COMP) | 170 -> (10) |
| (3) -> (4) | L(2*BAD_COMP) | 150 -> 120 |
| (3) -> (8) | L(GOOD_COMP) | 150 -> (10) |
| (4) -> (5) | L(BAD_COMP) | 120 -> 50 |
| (5) -> (6) | L(GOOD_COMP) | 120 -> 70 |
| (6) -> (7) | L(GOOD_COMP) | 50 -> 0 |
| (8) -> (7) | L(BAD_COMP) | 70 -> 0 |
| (8) -> (5) | L(0.8*2*GOOD_COMP) | (10) -> 50 |
| (8) -> (6) | L(0.2*2*BAD_COMP) | (10) -> 70 |
| (2) -> (1) | M(BAD_COMP) | 170 -> 200 |
| (3) -> (1) | M(GOOD_COMP) | 150 -> 200 |
| (4) -> (2) | M(GOOD_COMP) | 120 -> 170 |
| (4) -> (3) | M(BAD_COMP) | 120 -> 150 |
| (5) -> (4) | M(2*BAD_COMP) | 50 -> 120 |
| (5) -> (8) | M(GOOD_COMP) | 50 -> 100 NEW |
| (6) -> (4) | M(2*GOOD_COMP) | 70 -> 120 |
| (6) -> (8) | M(BAD_COMP) | 70 -> 100 NEW |
| (7) -> (5) | M(2*GOOD_COMP) | 0 -> 50 |
| (7) -> (6) | M(2*BAD_COMP) | 0 -> 70 |
| (8) -> (2) | M(0.8*2*BAD_COMP) | 100 NEW -> 170 |
| (8) -> (3) | M(0.2*2*GOOD_COMP) | 100 NEW -> 150 |

| TRANSITION | RATE | COMMENT |
|---|---|---|
| (1) -> (2) | L(2*BAD_COMP) | 200 -> 170 |
| (1) -> (3) | L(2*GOOD_COMP) | 200 -> 150 |
| (2) -> (4) | L(BAD_COMP) | 170 -> 100 |
| (2) -> (5) | L(2*GOOD_COMP) | 170 -> 120 |
| (3) -> (5) | L(2*BAD_COMP) | 150 -> 120 |
| (3) -> (6) | L(GOOD_COMP) | 150 -> 100 |
| (4) -> (7) | L(2*GOOD_COMP) | 100 -> 50 |
| (5) -> (7) | L(BAD_COMP) | 120 -> 50 |
| (5) -> (8) | L(GOOD_COMP) | 120 -> 70 |
| (6) -> (8) | L(2*BAD_COMP) | 100 -> 70 |
| (7) -> (9) | L(GOOD_COMP) | 50 -> 0 |
| (8) -> (9) | L(BAD_COMP) | 70 -> 0 |
| (2) -> (1) | M(BAD_COMP) | 170 -> 200 |
| (3) -> (1) | M(GOOD_COMP) | 150 -> 200 |
| (4) -> (2) | M(2*BAD_COMP) | 100 -> 170 |
| (5) -> (2) | M(GOOD_COMP) | 120 -> 170 |
| (5) -> (3) | M(BAD_COMP) | 120 -> 150 |
| (6) -> (3) | M(2*GOOD_COMP) | 100 -> 150 |
| (7) -> (4) | M(GOOD_COMP) | 50 -> 100 |
| (7) -> (5) | M(2*BAD_COMP) | 50 -> 120 |
| (8) -> (5) | M(2*GOOD_COMP) | 70 -> 120 |
| (8) -> (6) | M(BAD_COMP) | 70 -> 100 |
| (9) -> (7) | M(2*GOOD_COMP) | 0 -> 50 |
| (9) -> (8) | M(2*BAD_COMP) | 0 -> 70 |

FIG 27

| TRANSITION | RATE | COMMENT |
|---|---|---|
| (1) -> (2) | L(2*BAD_COMP) | 100 -> 70 |
| (1) -> (3) | L(2*GOOD_COMP) | 100 -> 50 |
| (2) -> (4) | L(BAD_COMP) | 70 -> 0 |
| (2) -> (5) | L(2*GOOD_COMP) | 70 -> 50 |
| (3) -> (5) | L(2*BAD_COMP) | 50 -> 50 |
| (3) -> (6) | L(GOOD_COMP) | 50 -> 0 |
| (4) -> (7) | L(2*GOOD_COMP) | 0 -> 0 |
| (5) -> (7) | L(BAD_COMP) | 50 -> 0 |
| (5) -> (8) | L(GOOD_COMP) | 50 -> 0 |
| (6) -> (8) | L(2*BAD_COMP) | 0 -> 0 |
| (7) -> (9) | L(GOOD_COMP) | 0 -> 0 |
| (8) -> (9) | L(BAD_COMP) | 0 -> 0 |
| (2) -> (1) | M(BAD_COMP) | 70 -> 100 |
| (3) -> (1) | M(GOOD_COMP) | 50 -> 100 |
| (4) -> (2) | M(2*BAD_COMP) | 0 -> 70 |
| (5) -> (2) | M(GOOD_COMP) | 50 -> 70 |
| (5) -> (3) | M(BAD_COMP) | 50 -> 50 |
| (6) -> (3) | M(2*GOOD_COMP) | 0 -> 50 |
| (7) -> (4) | M(GOOD_COMP) | 0 -> 0 |
| (7) -> (5) | M(2*BAD_COMP) | 0 -> 50 |
| (8) -> (5) | M(2*GOOD_COMP) | 0 -> 50 |
| (8) -> (6) | M(BAD_COMP) | 0 -> 0 |
| (9) -> (7) | M(2*GOOD_COMP) | 0 -> 0 |
| (9) -> (8) | M(2*BAD_COMP) | 0 -> 0 |

FIG 29

| TRANSITION | RATE | COMMENT |
|---|---|---|
| (1) -> (2) | L(2*BAD_COMP) | 100 ->70 |
| (1) -> (3) | L(2*GOOD_COMP) | 100 ->50 |
| (2) -> (3) | L(2*GOOD_COMP) | 70 ->50 |
| (2) -> (4) | L(BAD_COMP) | 70 ->0 |
| (3) -> (4) | L(GOOD_COMP+0.0384605572387669*BAD_COMP) | 50 ->0 |
| (2) -> (1) | M(BAD_COMP) | 70 ->100 |
| (3) -> (1) | M(0.9615394427761233*GOOD_COMP) | 50 ->100 |
| (3) -> (2) | M(0.0384605572387669*GOOD_COMP) | 50 ->70 |
| (4) -> (2) | M(0.7811881600018003*2*BAD_COMP) | 0 ->70 |
| (4) -> (3) | M(0.0156237632003601*2*BAD_COMP+0.2031099579965635*2*GOOD_COMP) | 0 ->50 |

FIG 31

| TRANSITION | RATE | COMMENT |
|---|---|---|
| (1) -> (2) | L(2*BAD_COMP) | 100 ->70 |
| (1) -> (3) | L(2*GOOD_COMP) | 100 ->50 |
| (2) -> (3) | L(2*GOOD_COMP) | 70 ->50 |
| (2) -> (4) | L(BAD_COMP) | 70 ->0 |
| (3) -> (4) | L(GOOD_COMP+0.0384605572387669*BAD_COMP) | 50 ->0 |
| (2) -> (1) | M(BAD_COMP) | 70 ->100 |
| (3) -> (1) | M(0.9615394427761233*GOOD_COMP) | 50 ->100 |
| (3) -> (2) | M(0.0384605572387669*GOOD_COMP) | 50 ->70 |
| (4) -> (2) | M(0.7811881600018003*2*BAD_COMP) | 0 ->70 |
| (4) -> (3) | M(0.0156237632003601*2*BAD_COMP+0.2031099579656 35*2*GOOD_COMP) | 0 ->50 |

FIG 34

| TRANSITION | RATE | COMMENT |
|---|---|---|
| (1) -> (2) | L(2*LINE_DOWNSTREAM) | 100 -> 70 |
| (1) -> (3) | L(2*LINE_UPSTREAM) | 100 -> 50 |
| (2) -> (4) | L(LINE_DOWNSTREAM) | 70 -> 0 |
| (2) -> (5) | L(2*LINE_UPSTREAM) | 70 -> 50 |
| (3) -> (5) | L(2*LINE_DOWNSTREAM) | 50 -> 50 |
| (3) -> (6) | L(LINE_UPSTREAM) | 50 -> 0 |
| (4) -> (7) | L(2*LINE_UPSTREAM) | 0 -> 0 |
| (5) -> (7) | L(LINE_DOWNSTREAM) | 50 -> 0 |
| (5) -> (8) | L(LINE_UPSTREAM) | 50 -> 0 |
| (6) -> (8) | L(2*LINE_DOWNSTREAM) | 0 -> 0 |
| (7) -> (9) | L(LINE_UPSTREAM) | 0 -> 0 |
| (8) -> (9) | L(LINE_DOWNSTREAM) | 0 -> 0 |
| (2) -> (1) | M(LINE_DOWNSTREAM) | 70 -> 100 |
| (3) -> (1) | M(LINE_UPSTREAM) | 50 -> 100 |
| (4) -> (2) | M(2*LINE_DOWNSTREAM) | 0 -> 70 |
| (5) -> (2) | M(LINE_UPSTREAM) | 50 -> 70 |
| (5) -> (3) | M(LINE_DOWNSTREAM) | 50 -> 50 |
| (6) -> (3) | M(2*LINE_UPSTREAM) | 0 -> 50 |
| (7) -> (4) | M(LINE_UPSTREAM) | 0 -> 0 |
| (7) -> (5) | M(2*LINE_DOWNSTREAM) | 0 -> 50 |
| (8) -> (5) | M(2*LINE_UPSTREAM) | 0 -> 50 |
| (8) -> (6) | M(LINE_DOWNSTREAM) | 0 -> 0 |
| (9) -> (7) | M(2*LINE_UPSTREAM) | 0 -> 0 |
| (9) -> (8) | M(2*LINE_DOWNSTREAM) | 0 -> 0 |

FIG 37

| TRANSITION | RATE | COMMENT |
|---|---|---|
| (1) -> (2) | L(2*LINE_DOWNSTREAM) | 100 -> 70 |
| (1) -> (3) | L(2*LINE_UPSTREAM) | 100 -> 50 |
| (2) -> (4) | L(LINE_DOWNSTREAM) | 70 -> 0 |
| (2) -> (5) | L(2*LINE_UPSTREAM) | 70 -> 50 |
| (3) -> (5) | L(2*LINE_DOWNSTREAM) | 50 -> 50 |
| (3) -> (6) | L(LINE_UPSTREAM) | 50 -> 0 |
| (4) -> (7) | L(2*LINE_UPSTREAM) | 0 -> 0 |
| (5) -> (7) | L(LINE_DOWNSTREAM) | 50 -> 0 |
| (5) -> (8) | L(LINE_UPSTREAM) | 50 -> 0 |
| (6) -> (8) | L(2*LINE_DOWNSTREAM) | 0 -> 0 |
| (7) -> (9) | L(LINE_UPSTREAM) | 0 -> 0 |
| (8) -> (9) | L(LINE_DOWNSTREAM) | 0 -> 0 |
| (2) -> (1) | M(LINE_DOWNSTREAM) | 70 -> 100 |
| (3) -> (1) | M(MDT_24) | 50 -> 100 |
| (4) -> (2) | M(2*LINE_DOWNSTREAM) | 0 -> 70 |
| (5) -> (2) | M(MDT_24) | 50 -> 70 |
| (5) -> (3) | M(LINE_DOWNSTREAM) | 50 -> 50 |
| (6) -> (3) | M(MDT_202) | 0 -> 50 |
| (7) -> (4) | M(MDT_24) | 0 -> 0 |
| (7) -> (5) | M(2*LINE_DOWNSTREAM) | 0 -> 50 |
| (8) -> (5) | M(MDT_202) | 0 -> 50 |
| (8) -> (6) | M(LINE_DOWNSTREAM) | 0 -> 0 |
| (9) -> (7) | M(MDT_202) | 0 -> 0 |
| (9) -> (8) | M(2*LINE_DOWNSTREAM) | 0 -> 0 |

SYSTEM AND METHOD FOR CALCULATING A PRODUCTIVITY OF AN INDUSTRIAL INSTALLATION

CROSS-REFERENCE TO RELATED APPLICATIONS

This application claims priority to PCT Application No. PCT/EP2014/063710, having a filing date of Jun. 27, 2014, the entire contents of which are hereby incorporated by reference.

FIELD OF TECHNOLOGY

The following relates to a method and a system for calculating a productivity of an industrial installation consisting of installation modules, in particular an industrial installation which produces chemical, biochemical or pharmaceutical products. A product may also be electrical energy or the provision of sensor data, e.g., in the case of building monitoring, the provision of video images or data of a fire alarm system.

BACKGROUND

In the operation of an industrial installation IA, in particular, an industrial installation for producing one or more products, for example chemical, biological or pharmaceutical products, the reliability, availability and maintainability of the industrial installation IA have great importance. Therefore, as early as during the design of such an industrial installation there is the need, when planning the industrial installation, to simulate various possible configurations of the industrial installation in a computer-aided manner in order to determine the productivity P of the industrial installation IA with regard to one or more end products, in particular in the case of failures of installation components.

In the case of the failure of an installation component or of an installation module of the industrial installation, it is necessary, particularly in the case of chemical installations, to cause the latter to be restarted or to put the latter into operation again after a failure. These restart times for restarting an installation module can comprise a few hours or even days.

SUMMARY

An aspect relates to providing a method and a system for calculating a productivity of an industrial installation consisting of installation modules which, in addition to availabilities of individual installation modules or sub-installations and the linkages thereof, also takes account of their respective reliability and resulting losses of productivity in particular on account of restart times of installation modules in the calculation of the productivity for one or more products of the industrial installation.

Accordingly, in accordance with a first aspect, embodiments of the invention provide a method for calculating a productivity of an industrial installation consisting of or including installation modules, wherein a Markov model is stored for each installation module, said Markov model indicating, for operating states of the relevant installation module with a different productivity, probabilities of the relevant installation module being in the different operating states and transition rates of state changes between the operating states of the relevant installation module, wherein a Cartesian product is calculated from a first Markov model of a first installation module and from a second Markov model of a second installation module linked with the first installation module within the industrial installation or of a sub-installation linked with the first installation module within the industrial installation, said Cartesian product indicating, for operating states of a combined sub-installation consisting of the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, wherein the calculation of the Cartesian product and the subsequent reduction thereof are carried out progressively until the combined sub-installation forms the entire industrial installation.

The method according to embodiments of the invention affords the advantage that it automatically takes into account concomitantly the effect of restart times of dependent installation modules for the assessment of a productivity of the industrial installation.

In one possible embodiment of the method according to the invention, the installation modules and sub-installations in each case have a state time proportion distribution indicating for at least two discrete operating states of the respective installation module or of the respective sub-installation, the time proportion of an operating time during which the installation module or the respective sub-installation is in the respective operating state.

In one possible embodiment of the method according to the invention, a specific time proportion of an operating time in which an installation module or a sub-installation is in an inactive operating state comprises a planned time proportion, in particular for carrying out maintenance and repair measures on the respective installation module or the respective sub-installation, and a time proportion caused by failure events, in particular for restarting the respective installation module or the respective sub-installation.

One advantage here is that maintenance measures and/or repair measures in accordance with a maintenance and/or repair plan can concomitantly have an influence on the calculation of the productivity of the industrial installation.

A further advantage is that restart times or times for shutting down and starting up installation modules or sub-installations concomitantly have an influence on the calculation of the productivity of the industrial installation.

In a further possible embodiment of the method according to the invention, the state time proportion distributions are linked by linkage elements, which are selected in accordance with a configuration of the industrial installation, to form a layout model of the industrial installation, wherein, on the basis of the generated layout model, the productivity of the industrial installation with regard to at least one end product is calculated by a calculation unit.

In a further possible embodiment of the method according to the invention, the state time proportion distributions of the selectable installation modules are read from a database to which the calculation unit has access.

In a further possible embodiment of the method according to the invention, the time proportions—indicated in the state time proportion distribution—for the different operating states of the respective installation module are set depending on installation parameters and/or characteristic Figures of the respective installation module and/or depending on ambient parameters.

In a further possible embodiment of the method according to the invention, the selectable linkage elements comprise arithmetic and/or logical linkage elements.

In a further possible embodiment of the method according to the invention, one of the selectable linkage elements is formed by a combination linkage element, which generates, for each possible combination of operating states of upstream installation modules and/or sub-installations, a state time proportion distribution indicating, for each combined state, a productivity with regard to a product output by the upstream installation modules and/or sub-installations.

In a further possible embodiment of the method according to the invention, one of the selectable linkage elements is formed by a minimization linkage element, which generates, for each possible combination of operating states of upstream installation modules and/or sub-installations, a state time proportion distribution indicating, for each combined state, the minimum of the productivities associated with the operating states with regard to a product output by the upstream installation modules and/or sub-installations.

In a further possible embodiment of the method according to the invention, the installation modules and the linkage elements are linked with one another via linkage lines for generating the layout model of the industrial installation by a graphical editor.

In a further possible embodiment of the method according to the invention, for each end product of the industrial installation, a result state time proportion distribution is calculated which indicates, for each operating state of the entire industrial installation, a productivity with regard to the end product output by the industrial installation.

In a further possible embodiment of the method according to the invention, the result state time proportion distributions of the different end products output by the industrial installation are weighted with the respective allocated value per produced quantity of the respective end product, wherein the total value of all the end products output by the industrial installation is maximized.

In a further possible embodiment of the method according to the invention, the end products of the industrial installation comprise chemical and/or biochemical and/or pharmaceutical products and/or sensor data and/or electrical power.

Embodiments of the invention accordingly provide a planning software tool for planning an industrial installation having program commands for carrying out a calculation of a productivity of an industrial installation consisting of or including installation modules, wherein a Markov model is stored for each installation module, said Markov model indicating, for operating states of the relevant installation module with a different productivity, probabilities of the relevant installation module being in the different operating states and transition rates of state changes between the operating states of the relevant installation module, wherein a Cartesian product is calculated from a first Markov model of a first installation module and from a second Markov model of a second installation module linked with the first installation module within the industrial installation or of a sub-installation linked with the first installation module within the industrial installation, said Cartesian product indicating, for operating states of a combined sub-installation consisting of the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, wherein the calculation of the Cartesian product and the subsequent reduction thereof are carried out progressively until the combined sub-installation forms the entire industrial installation.

Embodiments of the invention accordingly provide an industrial installation comprising an installation controller which controls installation components of the industrial installation depending on productivities which are calculated with regard to end products of the industrial installation by means of a calculating method for calculating a productivity of an industrial installation consisting of or including installation modules, wherein a Markov model is stored for each installation module, said Markov model indicating, for operating states of the relevant installation module with a different productivity, probabilities of the relevant installation module being in the different operating states and transition rates of state changes between the operating states of the relevant installation module, wherein a Cartesian product is calculated from a first Markov model of a first installation module and from a second Markov model of a second installation module linked with the first installation module within the industrial installation or of a sub-installation linked with the first installation module within the industrial installation, said Cartesian product indicating, for operating states of a combined sub-installation consisting of the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, wherein the calculation of the Cartesian product and the subsequent reduction thereof are carried out progressively until the combined sub-installation forms the entire industrial installation.

Embodiments of the invention accordingly provide a system for calculating a productivity of an industrial installation consisting of or including installation modules, comprising:

a database, in which a Markov model is stored for each installation module, said Markov model indicating, for operating states of the relevant installation module with a different productivity, probabilities of the relevant installation module being in the different operating states and transition rates of state changes between the operating states of the relevant installation module; and comprising a calculation unit, which calculates a Cartesian product from a first Markov model of a first installation module and from a second Markov model of a second installation module linked with the first installation module within the industrial installation or of a sub-installation linked with the first installation module within the industrial installation, said Cartesian product indicating, for operating states of a combined sub-installation consisting of or including the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, wherein the calculation of the Cartesian product and the subsequent reduction thereof are carried out progressively until the combined sub-installation forms the entire industrial installation.

Possible embodiments of the system and method according to the invention for calculating a productivity of an industrial installation consisting of or including installation modules are explained in greater detail below with reference to the accompanying Figures.

BRIEF DESCRIPTION

Some of the embodiments will be described in detail, with reference to the following figures, wherein like designations denote like members, wherein:

FIG. 18 shows a transition table for the calculated Cartesian product of a Markov model as illustrated in FIG. 17;

FIG. 20 shows a transition table for the reduced Markov model illustrated in FIG. 19;

FIG. 22 shows a transition table for the reduced Markov model illustrated in FIG. 21;

FIG. 27 shows a transition table for the Cartesian product of a Markov model as illustrated in FIG. 26;

FIG. 29 shows a transition table for the reduced Markov model illustrated in FIG. 28;

FIG. 31 shows a transition table for the reduced Markov model illustrated in FIG. 30;

FIG. 34 shows a transition table for the Cartesian product of a Markov model as illustrated in FIG. 33;

FIG. 37 shows a transition table for the diagram of a Cartesian product of a Markov model as illustrated in FIG. 36.

DETAILED DESCRIPTION

Figure 1:
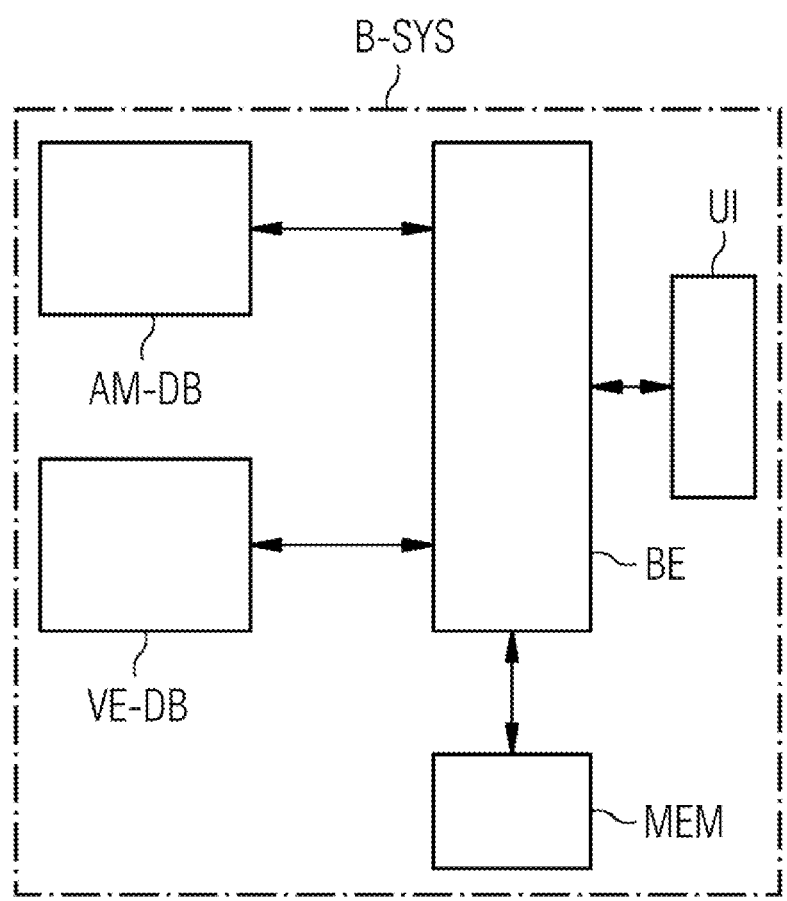
FIG. 1 shows a block diagram of one possible embodiment of a system for calculating a productivity of an industrial installation consisting of or including installation modules.

As can be discerned from FIG. 1, in the illustrated exemplary embodiment of a calculation system B-SYS according to the invention for calculating a productivity P of an industrial installation IA consisting of or including installation modules AM, the calculation system B-SYS comprises a calculation unit BE containing, for example, one or more microprocessors for carrying out program commands. In the exemplary embodiment illustrated, the calculation unit BE has access to an installation module database AM-DB and a linkage element database VE-DB. In the installation module database AM-DB, respectively associated state time proportion distributions ZZAV and/or Markov models MM are stored for a multiplicity of different installation modules AM. The installation modules AM can be simple or elementary installation modules, for example valves or pumps, or more complex installation components or sub-installations TA assembled from elementary installation modules AM. Each installation module AM models at least one associated installation component in the configurable industrial installation IA. The industrial installation IA is, for example, an installation for producing one or more end products. By way of example, the industrial installation IA can be an IGCC installation (Integrated Gasification Combined Cycle). The IGCC installation is an installation in which a primary fuel, such as, for example, coal, biomass or waste, is converted in a gasifier substoichiometrically to form high-energy fuel gas. A raw gas that arises is cooled in the process, wherein the waste heat from the exothermic gasification process is conducted into a water vapor circuit of the industrial installation IA. The raw gas can be purified and in this case passes through desulphurization installations and corresponding filters. Furthermore, the gas is burnt in a gas turbine. Besides the conversion into electricity from the synthesis gas, it is possible to generate further material products, in particular hydrogen, methanol, fuels or synthetic natural gas. Such an industrial installation IA consists of a multiplicity of installation components which are connected to one another, in particular via pipes and lines. An IGCC installation IA comprises, for example, coal mills, silos, carbon black water systems and coal gasifiers, wherein the coal gasifiers yield a raw synthesis gas which can be subsequently processed in order finally to be fed to a combustion chamber of a gas turbine. The coal mills pulverize coal, for example, wherein the pulverized coal is temporarily stored in special containers, or silos, containing nitrogen in order to prevent explosions. The pulverized temporarily stored coal is fed to coal gasifiers that generate synthesis gas. Coal gasifiers are connected to carbon black water systems for their cleaning. A plurality of installation components can form a technical subsystem or sub-installation TA of the entire industrial installation IA. By way of example, an installation module AM for a sub-installation TA can consist of interlinked installation modules AM of elementary installation components.

Each installation module AM has at least two discrete operating states. By way of example, an installation module AM has a first operating state, in which it is inactive and does not output a product or intermediate product, and a second, active state, in which it outputs a product or intermediate product to a downstream installation component. In this simple example, the installation component has a productivity P of 0% in the first, non-active operating state and a productivity P of 100% with regard to the respective intermediate product in the second operating state. An installation component of the industrial installation IA can output one or more intermediate products. More complex subsystems or composite installation components of the industrial installations IA can have a higher number of different discrete operating states, wherein productivity measures can be specified for each operating state for the respective intermediate products that are output by the installation component.

For the installation components there are in each case state time proportion distributions ZZAV for at least two discrete operating states of the respective installation module AM, wherein a time proportion ZA of the operating time is indicated during which the installation module AM is in the respective discrete operating state. By way of example, in the simple example illustrated in FIG. 5, the first installation module AM-1 is in an operating state in which it has a productivity P of 100% with regard to its end product with a time proportion ZA of 90% of its operating time, and is in an operating state in which it does not output a product (P=0%) only for 10% of its operating time. The majority proportion of the installation components has an active operating state.

The time proportion ZA of the operating time in which the installation module AM is in an inactive operating state can comprise a planned time proportion and an unplanned time proportion. The planned predefined time proportion comprises a time proportion which is used for carrying out maintenance and repair measures on the respective installation module. The unplanned time proportion concerns failure events in the installation module AM, in particular a time proportion for restarting the installation module AM. In the simple example illustrated in FIG. 5, the installation module AM-1 is in an inactive operating state during 10% of its operating time and produces 0% of the end product. Said time proportion of 10% can be composed of a planned time proportion of 5%, for example, in which the installation module AM-1 is maintained and/or repaired, and of a time proportion caused by possible failure events. By way of example, the latter time proportion caused by failure events can comprise 5% of the operating time. The time proportion caused by failure events can be estimated or calculated on the basis of empirical values or historical data present for the respective installation component of the industrial installation IA. Furthermore, the time proportion caused by failure events can be dependent on further parameters, for example on the lifetime or ageing of the respective installation module AM, and on parameters of the industrial installation or ambient parameters. By way of example, for an already used installation module which is disassembled from a different installation and which is installed for the new installation to be created, the life or operating time of said installation module can be concomitantly taken into account in the dimensioning of the time interval or time proportion caused by failure events. If, for example, an installation module AM-1 to be installed has already experienced an operating time of a few years, the time proportion ZA to be provided for failure events should be set higher than for an installation module of identical time which is newly installed in the industrial installation IA. The planned time proportion in which the installation module is in an inactive operating state can be set or altered depending on a maintenance and/or repair plan for the respective installation component. A corresponding state time proportion distribution ZZAV and/or Markov model MINI can be stored as a data set for each installation module AM provided in the installation module database AM-DB. In one possible embodiment, the time proportions ZA indicated in the stored state time proportion distribution ZZAV and/or the Markov model MM for the different operating states of the installation module AM are settable. In one possible embodiment, the state time proportion distributions ZZAV are set by a user via a user interface UI, as is illustrated in FIG. 1. Furthermore, the state time proportion distributions ZZAV of the different installation modules AM can be altered depending on simulated installation parameters AP of the industrial installation IA ZZAV(AP) or depending on simulated ambient parameters UP ZZAV(UP). By way of example, the state time proportion distribution ZZAV may vary if the pressure existing internally in the industrial installation IA decreases or increases. Furthermore, the state time proportion distribution ZZAV of an installation module AM may vary depending on an ambient temperature (UP=T) of the industrial installation IA. By way of example, if the industrial installation IA is intended to be constructed in a desert in which high temperatures T and high temperature fluctuations AT prevail, for each installation module AM assigned to an installation component of the industrial installation IA a state time proportion distribution ZZAV appropriate for the high ambient temperature can be stored in the installation module database AM-DB. The state time proportion distribution ZZAV of an installation module AM is thus dependent on the life LZ on account of the ageing of the associated installation component AK, on internal installation parameters AP of the industrial installation IA, and on ambient parameters UP, for example the prevailing external temperature, ZZAV(LZ,AP,UP).

Furthermore, the state time proportion distribution ZZAV of an installation component can be dependent on a maintenance plan for the respective installation component AK. If maintenance or a repair on an installation component is provided for example for a specific day in the week, the state time proportion distribution ZZAV of the installation component can have a time proportion ZA of 0% for a first operating state of a 100% productivity (P=100%) and a time proportion ZA of 100% for a second operating state with 0% productivity (P=0%) on this maintenance day. Each physical installation component of the industrial installation IA or each sub-installation TA of the industrial installation can be assigned a corresponding installation module AM with an associated state time proportion distribution ZZAV.

The state time proportion distributions ZZAV of the installation modules AM are manually or semiautomatically linked by linkage elements VE in the calculation system B-SYS to form a layout model of the industrial installation IA. In this case, the linkage is effected in accordance with a planned or possible configuration of the industrial installation IA, for example manually, that is to say that the linkage elements VE are selected in accordance with said configuration by a user, for example by means of the user interface UI of the calculation system B-SYS. In one possible embodiment, the installation modules AM, which respectively represent an installation component or a subsystem of the industrial installation IA as a data model, and the linkage elements VE are linked with one another via linkage lines by a user by means of a graphical editor, in order to generate the layout data model of the industrial installation IA. The installation modules AM can be selected from a library of installation modules. In one possible embodiment, the layout model generated with the aid of the editor can be stored in a data memory MEM of the system B-SYS. On the basis of the generated layout model, the productivity P of the industrial installation IA with regard to at least one end product is subsequently calculated by the calculation unit BE. By means of the calculation, the productivity P of the planned industrial installation IA with regard to at least one end product, for example a chemical, biological, electrical or pharmaceutical end product, is thus simulated by the calculation unit BE on the basis of the layout data model of the industrial installation IA. The selection of the installation modules AM from the installation module database AM-DB and the selection of the used linkage elements VE from the linkage element database VE-DB are preferably carried out with the aid of a graphical editor, for example a visio-based RAM (Reliability, Availability, Maintainability) layout editor. Said layout editor enables the modeling of the interconnections or linkages between the installation modules or sub-installations of the industrial installation IA. The layout editor is preferably displayed to the user on a screen by means of a graphical user interface UI. The different installation modules AM can be positioned on the screen of the interface UI and are linked with one another with the aid of linkage elements VE. The linkage elements VE selected from the linkage element database VE-DB can comprise arithmetic and/or logical linkage elements. The selected installation modules AM and the linkage elements VE can be connected to one another via linkage lines in order to create the layout model of the industrial installation IA. In one possible embodiment, the linkage lines can be weighted with positive or negative weighting factors w. The selectable linkage elements VE are preferably situated in the linkage element database VE-DB of the calculation system B-SYS, as illustrated in FIG. 1. In one possible embodiment, one of the selectable linkage elements is a combination linkage element KOM-VE, which generates, for each possible combination of operating states of upstream installation modules AM, a state time proportion distribution ZZAV indicating, for each combined state, a productivity P with regard to a product output by the upstream installation modules AM. One example of such a combination linkage element VE is indicated in FIG. 6 for the simple example illustrated in FIG. 5. Furthermore, a minimization linkage element VE can be situated as a further linkage element VE in the linkage element database VE-DB, said minimization linkage element generating, for each possible combination of operating states of upstream installation modules AM, a state time proportion distribution ZZAV indicating, for each combined state, the minimum of the productivity measures P associated with the operating states with regard to a product output by the upstream installation modules AM. One example of such a minimization linkage element MIN-VE is shown in FIG. 7 for the simple example illustrated in FIG. 5. The different selectable linkage elements VE can be displayed to the user on the screen using different graphical symbols. The different linkage elements VE obtain as input the state time proportion distributions of the upstream installation modules which are linked with the linkage elements VE on the input side, and yield as output a state time proportion distribution ZZAV for the different possible combined discrete operating states. This is explained by way of example below with reference to FIGS. 2, 3, 4.

Figure 2:
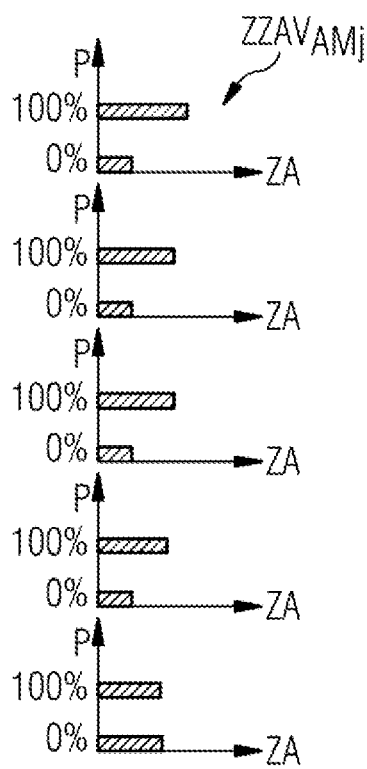
FIGS. 2, 3, 4 show diagrams for elucidating the functioning of the system for calculating a productivity of an industrial installation consisting of or including installation modules on the basis of a simple example.
Figure 3:
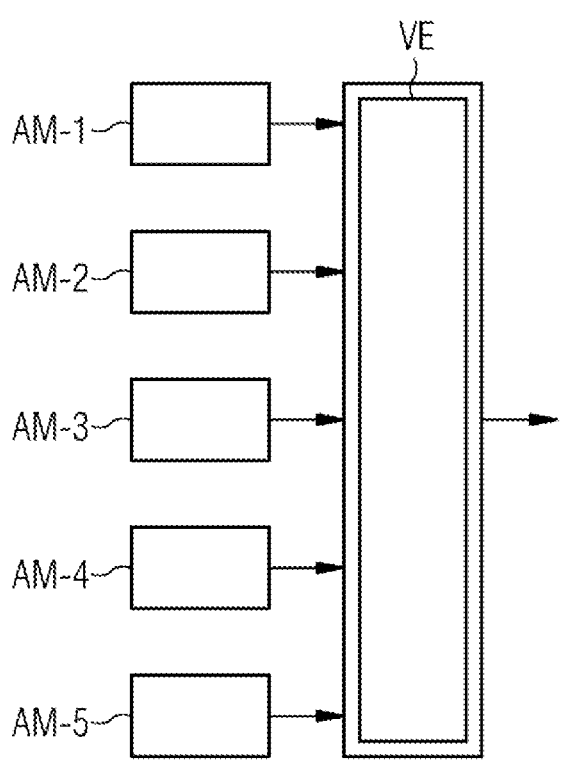
Figure 4:
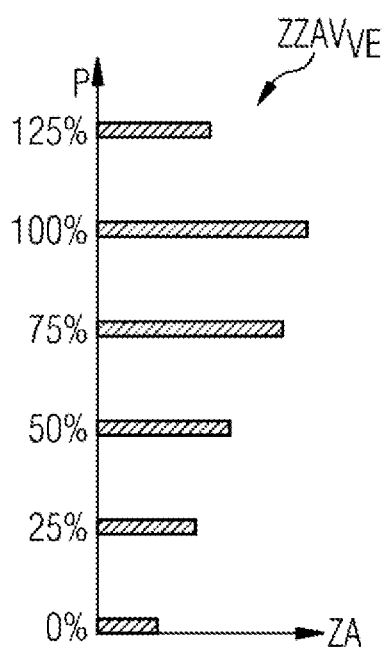

FIG. 2 shows state time proportion distributions ZZAV for installation modules AM which are linked with one another via a linkage element VE, as illustrated in FIG. 3. The installation modules AM-1, AM-2, AM-3, AM-4, AM-5 may be, for example, installation modules AM for coal gasifiers which are connected via busbars or headers and output a raw synthesis gas. In the example illustrated in FIG. 3, five installation modules each modeling a coal gasifier installation component are linked with one another via a linkage element VE, the end product or intermediate product of which is the raw synthesis gas produced. The state time proportion distributions ZZAV for the different installation modules AM-1 to AM-5 are illustrated in FIG. 2. In the simple example, each installation module AM-i has in each case two discrete operating states, namely an active operating state with a productivity measure P of 100% with regard to the product for the active operating state and with a productivity measure P of 0% for the inactive or failed operating state of the respective installation module AM. By way of example, the time proportion ZA for the active operating state (productivity measure P=100%) may be 95%, while the time proportion ZA for the inactive operating state (productivity measure P=0%) is 5%. The sum of all the time proportions ZA within the state time proportion distribution ZZAV yields 100%. As illustrated in FIG. 2, the state time proportion distributions ZZAV for example for the installation modules AM-1 to AM-4 are approximately identical, while the state time proportion distribution ZZAV for the fifth installation module AM-5 or the fifth coal gasifier modeled thereby indicates a time proportion of 50% for the active operating state and 50% for the inactive operating state. It is thereby possible to model, for example, the fact that the fifth installation module AM-5 is significantly older and therefore requires a higher time proportion for failure events or maintenance and/or repair measures. With the aid of the linkage element VE selected from the linkage element database VE-DB, a state time proportion distribution $ZZAV_{VE}$ is automatically calculated for the entire subsystem illustrated in FIG. 3, as indicated graphically in FIG. 4. In the simple example illustrated in FIG. 3, the subsystem has a productivity P of 100% if four of the five upstream installation modules or coal gasifiers are operating. If all five upstream coal gasifiers are operating, the subsystem has a productivity measure P of 125%, as illustrated in FIG. 4. If all five coal gasifiers fail simultaneously, the productivity measure P of the subsystem is 0%. The time proportion ZA of this combined operating state is very low, however, since it is very improbable that all five coal gasifiers will fail simultaneously. In the simple example illustrated in FIG. 4, that time proportion of the total operating time in which four of the five coal gasifiers are operating simultaneously is the highest. In this operating state a productivity measure of 100% of the subsystem TA is achieved, which corresponds for example to 1 t of the end product of the respective subsystem in a predefined operating period. The sub-installation TA illustrated in FIG. 3 and the associated calculated state time proportion distribution ZZAV illustrated in FIG. 4 can be linked with further installation modules AM and sub-installations TA for calculating the configuration of the industrial installation IA to be created.

By changing the linkages VE and by adding or eliminating installation modules AM, it is possible to alter the associated state time proportion distribution ZZAV of a subsystem TA with regard to at least one end product or intermediate product in a targeted manner. Furthermore, it is possible to alter the state time proportion distributions ZZAV of the different elementary installation modules AM in a simulation. In one possible embodiment, this can be carried out depending on installation parameters AP of the industrial installation IA, for example a prevailing internal pressure acting on boilers or pipes, or depending on ambient parameters UP, for example an ambient temperature T. If a very high external temperature T is simulated, for example, the state time proportion distributions ZZAV of the installation modules AM can vary to the effect that the time proportion ZA for the active operating state (productivity measure P=100%) decreases, while the time proportion ZA for the inactive operating state (productivity measure P=0%) increases for the respective affected installation module AM. In one possible embodiment variant or implementation of the system according to the invention, the coordinates or spatial coordinates of the associated installation components within the industrial installation IA are concomitantly taken into account for the different installation modules AM. As a result, it is possible, for example, also to simulate temperature gradients within an industrial installation IA. By way of example, if the installation module AM-1 in FIG. 3 is situated on a side of the industrial installation IA that faces the sun, on account of the higher temperature T it has a different state time proportion distribution ZZAV than, for example, the installation module AM-5 mounted on a side of the industrial installation IA that faces away from the sun.

Figure 5:
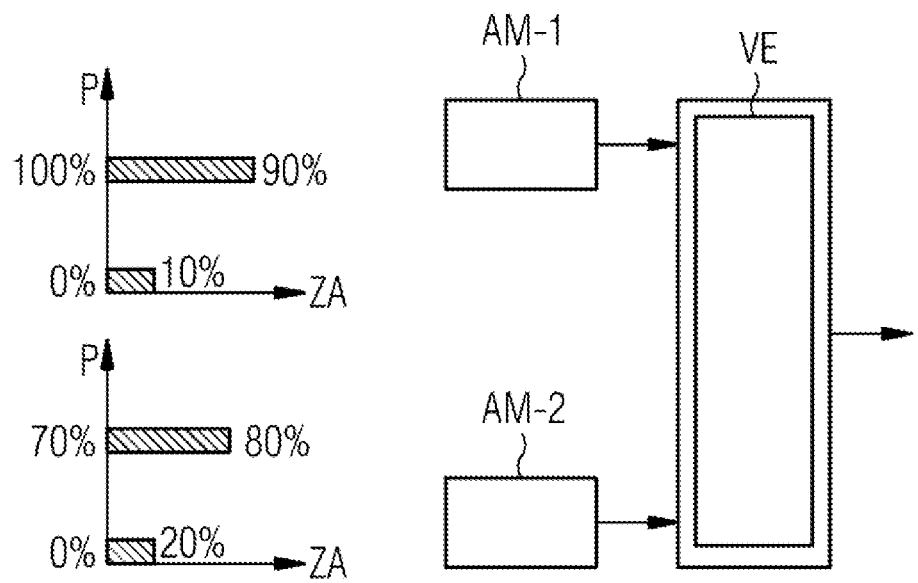
FIGS. 5, 6, 7 show diagrams for elucidating linkage elements which can be used in the method and system.
Figure 6:
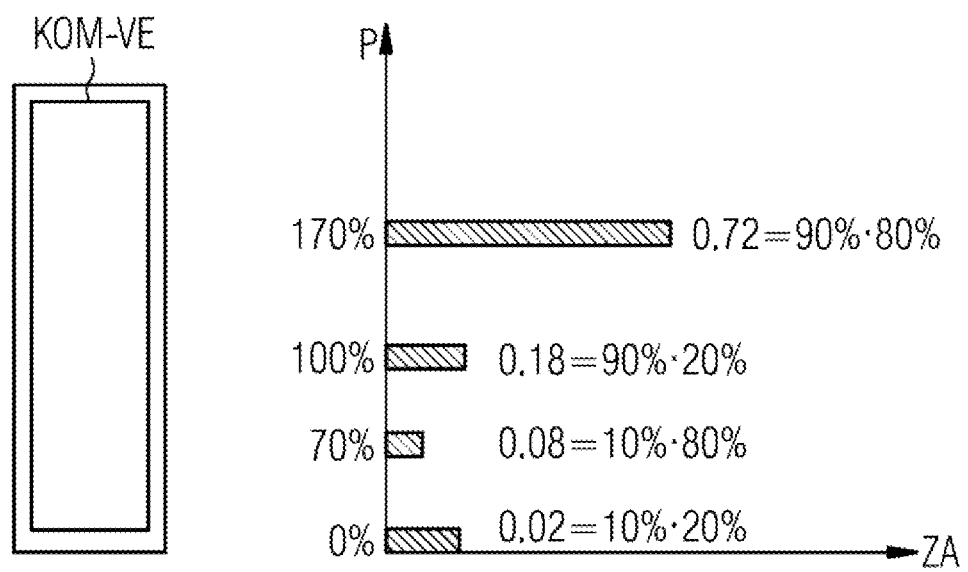
Figure 7:
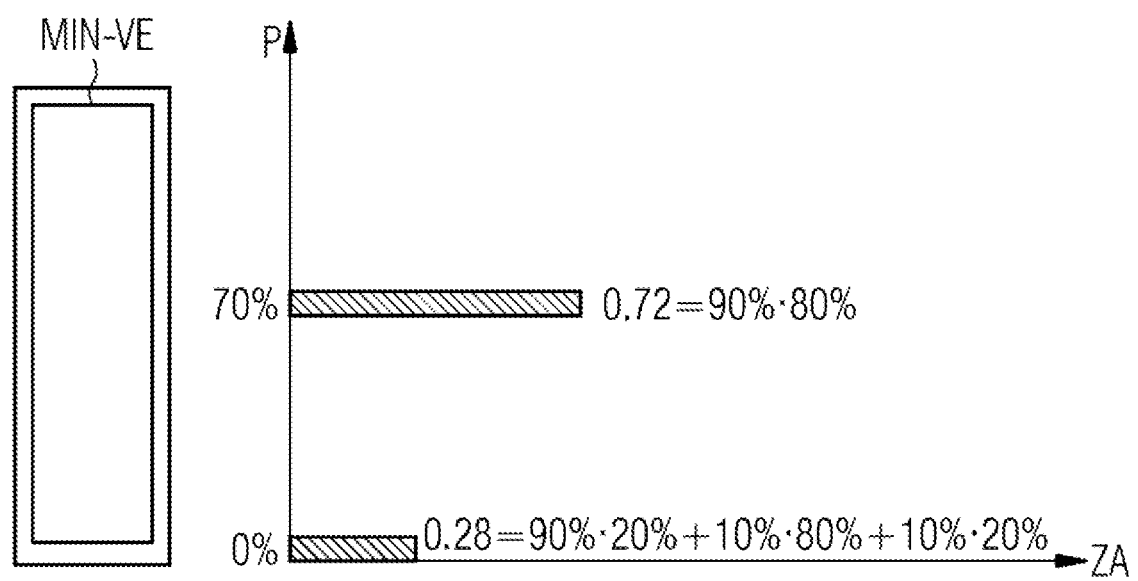

FIGS. 5, 6, 7 show diagrams for elucidating possible linkage elements VE such as can be used in the system according to the invention for calculating a productivity P of an industrial installation IA consisting of or including installation modules AM. In the simple subsystem TA illustrated in FIG. 5, two installation modules AM-1, AM-2 are linked with one another via an arithmetic linkage element VE with regard to an end product. The two installation modules AM-1, AM-2 have different state time proportion distributions ZZAV, as illustrated in FIG. 5. In the simple example illustrated in FIG. 5, both installation modules AM have in each case two discrete operating states, namely an active operating state and an inactive operating state. The first installation module AM-1 has a productivity of 100% in the active operating state and a productivity of 0% in the inactive operating state. The installation module AM-1 is in the active operating state for 90% of the operating time and in the inactive operating state for 10% of the operating time. By contrast, the other installation module AM-2 has only a productivity of 70% in the active operating state. By way of example, the installation module AM-2 may have a significantly higher operating age in comparison with the installation module AM-1, such that its productivity P in the active operating state is significantly lower than the productivity of the installation module AM-1. Moreover, in the example illustrated, the installation module AM-2 is in the active operating state only for 80% of the total operating time and in the inactive operating state for 20%. In this case, for example, it may be taken into account that the probability of unexpected failure events is higher for the further installation module AM-2. The linkage element VE illustrated in FIG. 5 then links the state time proportion distributions ZZAV of the two upstream installation modules AM-1, AM-2.

The linkage element VE may be, for example, a combination linkage element, as illustrated in FIG. 6. In this case, a state time proportion distribution ZZAV is generated for each possible combination of operating states of the two upstream installation modules AM-1, AM-2, said state time proportion distribution indicating for each combined state a productivity P with regard to the product output by the upstream installation modules AM. FIG. 6 shows the generated state time proportion distribution ZZAV for a combination linkage element KOM-VE in the simple example illustrated in FIG. 5. As illustrated in FIG. 6, four different combinations of states are possible, namely a first state with a production measure P of 170% if both installation modules AM-1, AM-2 are in an active operating state, an operating state with a productivity measure P of 100% if the first installation module AM-1 is in the active operating state while the second installation module AM-2 has failed or is in an inactive operating state, a third operating state with a productivity measure P of 70% if the first installation module AM-1 is inactive and only the second installation module AM-2 is active, and a fourth operating state with a productivity measure P of 0% if both installation modules AM-1, AM-2 are simultaneously in an inactive operating state. A time proportion ZA is automatically calculated for each combined state of the subsystem TA. In this regard, the time proportion ZA for the first operating state with a productivity measure of P=170% is 0.72, namely the product of the time proportion ZA in which the first installation module AM-1 is in the active operating state and the time proportion ZA in which the second installation module AM-2 is in an active operating state. As can be discerned in FIG. 6, the sub-installation TA comprising the two installation modules AM-1, AM-2 connected to one another is in a second operating state with a productivity measure of P=100% only in 18% of the operating time. In the third operating state of the sub-installation TA (productivity measure P=70%), the time proportion is 8%, and the sub-installation TA is in the fourth operating state (productivity measure P=0%) only in 2% of the operating time, that is to say that the time proportion ZA is 2% for this combined state in which both installation components have failed.

A further possible selectable linkage element VE is a minimization linkage element, as is illustrated in FIG. 7. The latter generates a state time proportion distribution ZZAV for each possible combination of operating states of upstream installation modules AM, said state time proportion distribution indicating for each combined state the minimum of the productivity measures P associated with the operating states with regard to a product output by the upstream installation modules AM. In the example illustrated, a first possible combination of operating states is if both installation modules AM-1, AM-2 are in the active operating state and producing fully, i.e. the first installation module having a productivity measure P of 100% and the second installation module having a productivity measure P of 70%. The minimum of the two productivity measures is 70%. The time proportion therefor is 72%, as illustrated in FIG. 7. The remaining possible combinations are P=100% for installation module AM-1 and P=0% for installation module AM-2, P=0% for installation module AM-1 and P=70% for installation module AM-2 and P=0% for installation module AM-1 and P=0% for installation module AM-2. The minimum with regard to the productivity measure P for these combinations is 0%. The corresponding calculated time proportion for this combined state is 28%, as illustrated in FIG. 7. With the two linkage elements VE illustrated in FIGS. 6, 7, namely the combination linkage element KOM-VE and the minimization linkage element MIN-VE, it is possible to model substantially all configurations of an industrial installation TA. The layout editor enables the modeling of the interconnections between the subsystems or sub-installations TA of the industrial installation IA. In a first step, a RAM layout of the industrial installation IA can be analyzed in order for example to identify dependencies between the subsystems TA of the industrial installation IA and for example the effects of a reduced productivity P of at least one subsystem TA on the productivity of the entire industrial installation IA with regard to an end or intermediate product. By assembling or linking the productivity characteristics or state time proportion distributions ZZAV of coupled and dependent sub-installations TA to form composite subsystems having an associated productivity characteristic, it is possible progressively to calculate a state time proportion distribution ZZAV with regard to the productivity P of the total system or the entire industrial installation IA with regard to one or more end products. As a result, an individual consideration of the different combinations of productivity levels of partly functioning or defective subsystems TA is avoided and an overall consideration of the entire industrial installation IA with regard to the productivity P thereof is made possible.

Figure 8:
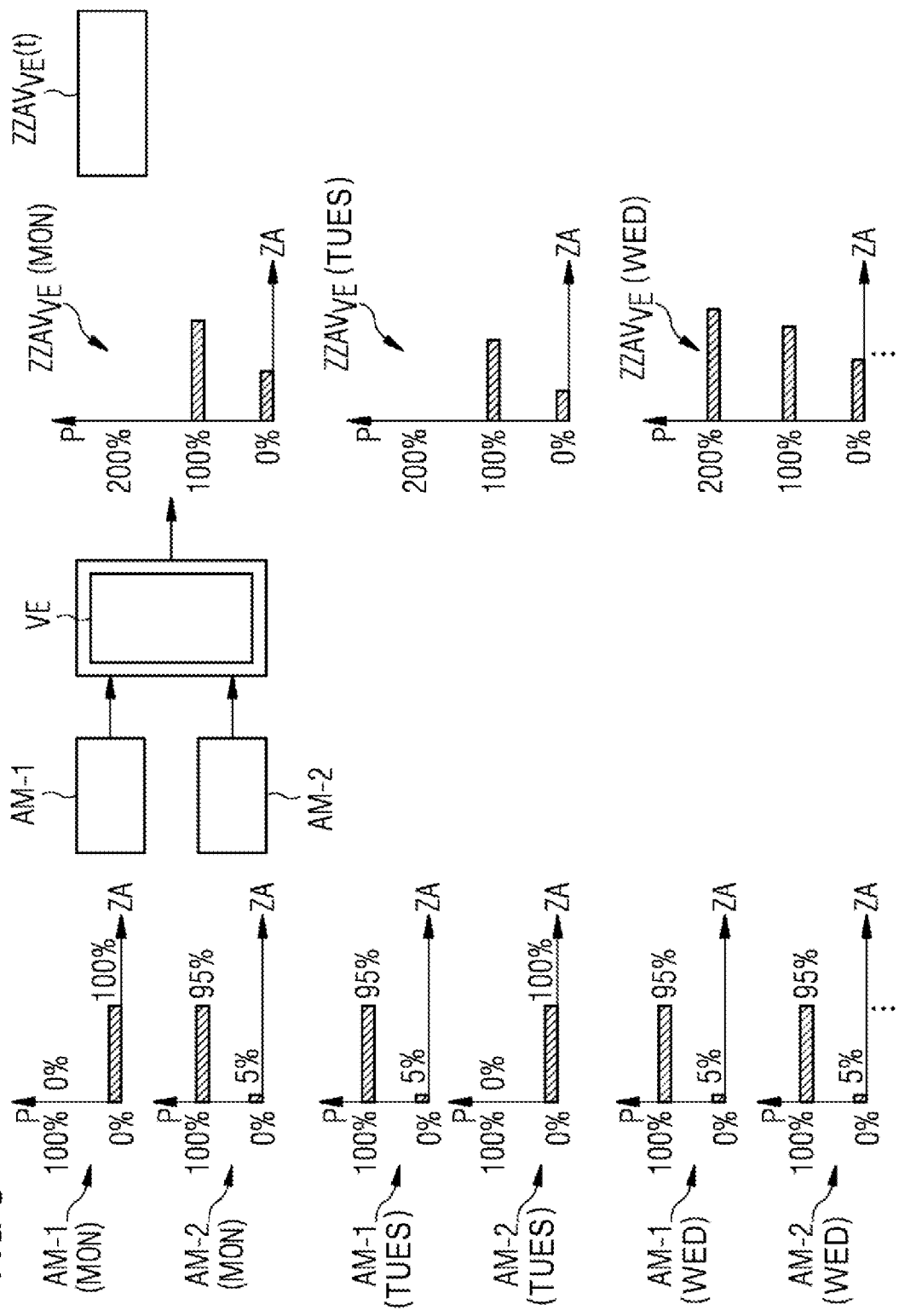
FIG. 8 shows diagrams for clarifying a time-dependent calculation of a productivity of an industrial installation consisting of or including installation modules.

The state time proportion distributions ZZAV of the different installation components may vary depending on a maintenance plan, as illustrated by way of example in FIG. 8. In the example illustrated in FIG. 8, the installation module AM-1 is maintained on a Monday (MO), such that on Monday it is in the active operating state with a time proportion of 0%, while for all of Monday it has a time proportion of 100% in the inactive operating state (productivity measure P=0%). The other installation module AM-2 has a normal time proportion distribution for Monday, wherein for example the time proportion for the active operating state is 95% and the time proportion for the inactive operating state is 5%. In the example illustrated, the other installation module AM-2 is maintained on Tuesday (TUES), such that said installation module is in the inactive operating state (productivity measure 0%) with a time proportion of 100% on Tuesday. Neither of the two installation modules AM-1, AM-2 is maintained on the third day (Wednesday). Accordingly, the linkage element VE results in a different state time proportion distribution for each of the three days, as indicated in FIG. 8. By way of example, if neither of the two installation modules AM is maintained on Wednesday (WED), the time proportion for the maximum productivity (productivity measure 200%) is higher than on the other two days, namely Monday or Tuesday, on which one of the two installation modules AM is maintained. The calculated state time proportion distributions ZZAV of subsystems TA thus vary dynamically depending on a schedule, for example a maintenance or repair plan, for the different installation modules AM of the industrial installation (ZZAV (t)). Furthermore, in the case of the system and method according to the invention it is possible to coordinate a maintenance plan optimally with the industrial installation IA in order to maximize the productivity P of the industrial installation IA with regard to one or more products. Furthermore, effects of a changed maintenance or repair plan on the productivity P of the industrial installation IA can be examined or analyzed. Furthermore, it is possible to examine to what extent redundancies provided within subsystems TA increase the installation productivity with regard to all end products or preserve it when maintenance measures are carried out. In the example illustrated in FIG. 3, it is possible for example to scrutinize whether or not the provision of a fifth redundant coal gasifier as installation module AM-5 is worthwhile on the basis of the increase in productivity.

Figure 9:
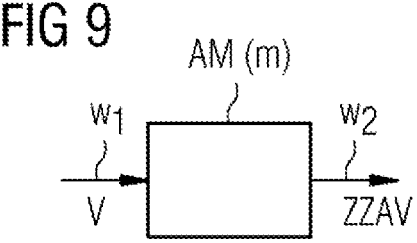
FIG. 9 shows a diagram for elucidating the functioning of the system and method for calculating a productivity of an industrial installation consisting of or including installation modules.

The method and system according to the invention make it possible to calculate an expected production of the industrial installation IA for different end products. The calculated productivity P can be multiplied by expected productivity values for the different products. By way of example, a result state time proportion distribution E-ZZAV for different end products output by the industrial installation IA can be weighted with or multiplied by the respective added value of the end product per produced quantity of the respective end product. In one possible embodiment, the total value of all the end products output by the industrial installation IA is then maximized. The total value of the products produced, calculated over the expected operating time of the industrial installation IA, can thereby be related to the capital expenditure for the complex industrial technical installation IA. In one possible embodiment of the system according to the invention, the installation modules AM and the linkage elements VE are linked via linkage lines by means of a graphical editor in order to generate the layout model of the industrial installation IA. The linkage lines can be weighted with positive or negative weighting factors $w_i$, as illustrated in FIG. 9. Each installation module AM can have a state time proportion distribution m. Upon input, the installation module AM obtains a state time proportion distribution v of the upstream modules, which can be weighted with a weighting factor $w_1$. The output of the installation module AM can likewise be weighted with a weighting factor $w_2$, as illustrated in FIG. 9. The state time proportion distribution ZZAV output by the installation module or subsystem is calculated as follows: ZZAV=min($w_1$, x, v, m)×$w_2$.

Figure 10:
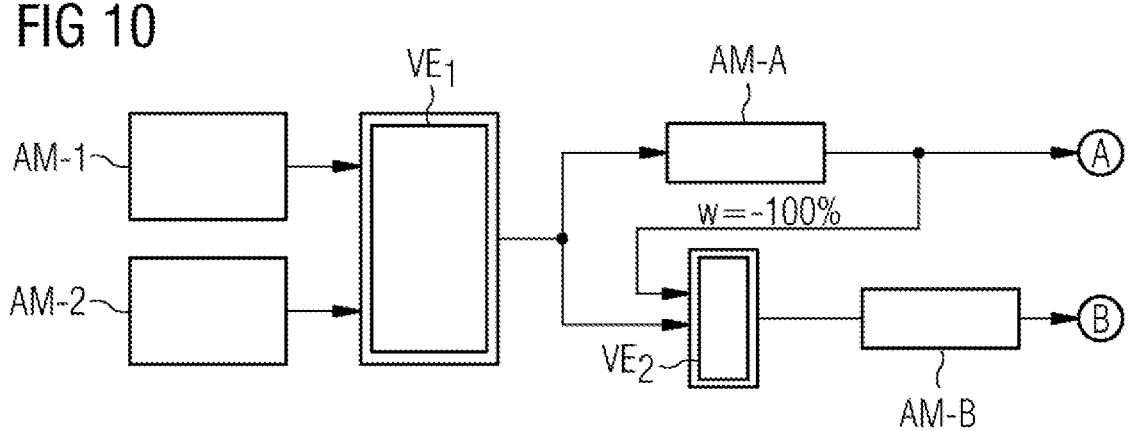
FIG. 10 shows a simple example of a layout model generated in accordance with the method and system, a prioritization of end products being possible with said layout model.

In one possible embodiment of the system according to the invention, the different end products of the industrial installation IA have associated production priorities. In one possible embodiment, these can be modeled by linkage lines with negative weighting factors. This can be explained on the basis of the simple example illustrated in FIG. 10. In the example of an industrial installation as illustrated in FIG. 10, the latter produces two end products A, B. The installation modules AM-1, AM-2 model two coal gasifiers as installation component of the industrial installation. The synthesis gas yielded by the coal gasifiers is combined and applied to a synthesis installation for producing the end product A, said synthesis installation being modeled by the installation module AM-A. A second synthesis component produces the second end product B. Said second synthesis component is modeled by the installation module AM-B, as illustrated in FIG. 10. The synthesis gas yielded by the coal gasifiers is applied to the synthesis component for the product B, although the product A is granted priority. For this purpose, the output of the installation module AM-A is fed back to an input of the second linkage element VE-2 via a linkage line weighted with a weighting factor of −100%, as illustrated in FIG. 10. While the first linkage element VE-1 models the combination of the synthesis gases output by the coal gasifiers, the second linkage element VE-2 models the prioritization of the first end product A relative to the second end product B of the industrial installation. By way of example, if both coal gasifiers operate with a productivity of 100%, the output of linkage element VE-1 has a productivity of 200%, which is applied both to the input of the installation module AM-A for synthesizing the product A and to the second input of the linkage element VE-2. If the installation module AM-A is in an active operating state, at least 100% is fed back and a state time proportion distribution is calculated at the second linkage element VE-2. Since both coal gasifiers are operating fully in this case (P=200%), the synthesis gas also suffices for producing the product B. However, if one of the two coal gasifiers fails and then has a productivity measure P of 0%, the output of the linkage element VE-1 yields only a productivity measure of 100%, from which 100% is subtracted by the linkage element VE-2 on account of the negative feedback, such that for the installation module AM-B only 0% is available at the input thereof. In this case, therefore, the entire synthesis gas produced is used for producing the end product A, such that no product B is produced. However, if the installation module AM-A has additionally failed and has a productivity measure P of 0%, then the negative weight at the input of the VE-2 is multiplied by 0% and the synthesis gas is available for the production of the product B in AM-B in this time proportion. By means of the negative weighting, it is thus possible to model a prioritization of one end product, for example of the product A, relative to another end product, for example the product B, with the aid of the layout editor. In the example illustrated in FIG. 10, the synthesis gas consumed in the synthesis A is subtracted from the synthesis gas produced by the coal gasifiers, in order to calculate the quantity of synthesis gas available for the synthesis B. Differences in productivity levels can thus be modeled with the aid of the layout editor. Thus enables a modeling and general calculation in the case of a prioritization of products which takes effect particularly in the case of a reduced productivity P of a subsystem TA or affects the quantity of end products produced. In one possible embodiment, the prioritization of the different end products can change depending on an instantaneous value of the respective end product. In one possible embodiment, the result state time proportion distributions E-ZZAV of the different end products output by the industrial installation IA are weighted with the respective value per produced quantity of the respective end product. Said value can be allocated, for example. In a further possible embodiment, the values of the different end products are communicated by a server S via a data network. By way of example, the value per produced quantity can be a market price of the product market. In one possible embodiment of the system according to the invention, the total value of all the end products output by the industrial installation IA is automatically maximized depending on instantaneous or forecast product values. The graphical modeling of the dependencies of the subsystems TA used and the analysis of the productivity P for the overall system or industrial installation IA thus enable the efficient assessment even of relatively complex technical installations IA including prioritization strategies for the end products thereof. This may be relevant to comparative assessments of the economic viability of installation designs and operating concepts, in order to obtain an installation configuration of the industrial installation IA that is optimally adapted to the technical boundary conditions and customer requirements. The method and system according to the invention are suitable for forecasting productivity values of arbitrary industrial installations IA, primarily for industrial installations IA which produce chemical, biological or pharmaceutical products. The products can also be generated electricity or electrical power, which are generated for example during the conversion of fuels into electricity. The products can furthermore comprise data, in particular sensor data, which are provided for example by a video monitoring system or a fire alarm system. Here, too, there are redundancies if two smoke detectors each monitor 60% of the area, or video recordings show a part of the subway section twice. With the system and method according to the invention it is possible to calculate or simulate in particular redundancies of installation components or installation modules AM and complex dependencies of installation parts and prioritization strategies of different end products. The calculation or simulation of the quantity of end products produced and the production values thereof can be carried out on the basis of instantaneous or forecast product values. The method and system according to the invention make it possible to exactly calculate or assess a productivity P of an industrial installation IA, particularly in the case of possible failures or maintenance-governed restrictions.

The method according to the invention for calculating a productivity of an industrial installation consisting of or including installation modules AM can be implemented as a program software tool that is executed on a computer system. The planning software tool can be used primarily for planning an industrial installation IA before the start-up thereof. Furthermore, the planning software tool can also be used during ongoing operation of the industrial installation IA in order to support control measures. An installation controller of the industrial installation IA can control installation components of the industrial installation IA depending on productivities, wherein the productivities P with regard to different end products of the industrial installation IA are calculated by a calculation system B-SYS according to the invention, as is illustrated in FIG. 1. Furthermore, the method or planning tool according to the invention can be used for calculating or simulating maintenance plans in order that the productivity P of the industrial installation IA is still kept as high as possible despite necessary maintenance measures. Generated layout data models for different subsystems TA or overall installations IA can be stored or saved in a data memory MEM in order to be reused in further projects for similarly structured industrial installations IA. In a further possible embodiment, the state time proportion distributions ZZAV that actually occurred within the operated industrial installation IA are recorded and the state time proportion distributions ZZAV of the corresponding installation modules AM are adapted in a corresponding manner to the real progressions in order to ensure as realistic a simulation as possible of the productivities of the components or subsystems TA.

Particularly in the case of relatively large industrial installations IA which produce chemical and/or biochemical and/or pharmaceutical products from raw products, for example, times in which installation modules or sub-installations are shut down from an operating state to a rest state, or conversely are started up from a rest state to an operating state, are of importance. Shutting down installation modules to an inactive operating state or starting up an installation module from a rest state to an active operating state can take a few hours or even days. In complex industrial installations IA having a multiplicity of installation modules AM, a plurality of installation modules are linked or interconnected in series and/or in parallel with one another. As a result, a plurality of installation modules are concatenated in series in production paths or production chains. If an installation module at the beginning of the production chain fails in this case, it is generally necessary to shut down the installation modules situated downstream in the production chain and to wait until the upstream installation module is ready for operation again. As soon as the upstream installation module is ready for operation again, the downstream installation modules within the production chain can be started up within a restart time. Accordingly, the failure of an installation module situated further upstream in a production chain within the industrial installation generally has a greater effect on the productivity of the industrial installation than the failure of an installation module situated downstream or at the end of a productivity chain of the industrial installation. The different installation modules within a complex industrial installation are thus dependent on one another. If an upstream installation module fails, this can have the effect, depending on the configuration of the industrial installation IA, that downstream installation modules, in particular within a production chain, must automatically likewise be shut down or must change their operating state. These dependencies are concomitantly taken into account in the method according to the invention for calculating a productivity of an industrial installation consisting of or including installation modules.

In one possible embodiment of the method according to the invention for calculating a productivity P of an industrial installation IA consisting of or including installation modules AM, a Markov model MM is stored for each installation module AM, for example in a database DB to which a calculation unit comprising a processor has access. Said Markov model MM indicates, for operating states of the relevant installation module AM having a different productivity P, probabilities of the relevant installation module AM being in the different operating states, and furthermore indicates transition rates of state changes between the operating states of the relevant installation module AM. A Cartesian product K-MM is calculated from a first Markov model MM of a first installation module AM and from a second Markov model MM of a second installation module AM linked with the first installation module AM within the industrial installation IA, or a sub-installation TA linked with the first installation module AM within the industrial installation IA. This calculated Cartesian product K-MM indicates, for operating states of a combined sub-installation TA, which consists of the two linked installation modules AM or of the sub-installation TA linked with the first installation module AM, probabilities of the combined sub-installation TA being in the different operating states, and transition rates of state changes between the operating states of the combined sub-installation TA. The calculated Cartesian product is subsequently reduced to a Markov model MM of the combined sub-installation TA by those operating states of the calculated Cartesian product which have the same productivity P being combined to form an operating state, wherein the calculation of the Cartesian product K-MM and the subsequent reduction thereof are carried out progressively until the combined sub-installation TA forms or comprises the entire industrial installation IA.

Figure 11:
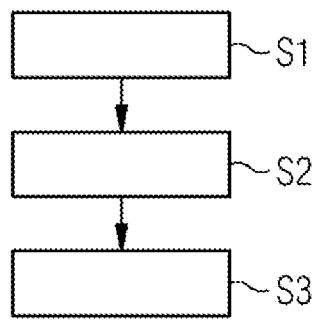
FIG. 11 shows a flow diagram for illustrating one possible embodiment of the method.

FIG. 11 shows a simple flow diagram for illustrating different steps of the method according to the invention for calculating a productivity P of an industrial installation IA consisting of or including installation modules AM.

In a first step S1, for the installation modules AM of the industrial installation IA to be examined, an associated Markov model MM is in each case read from a database DB. Said Markov model MM indicates, for operating states of the relevant installation module AM having a different productivity, probabilities of the relevant installation module AM being in the different operating states, and transition rates of state changes between the different operating states of the relevant installation module AM.

In a further step S2, a Cartesian product K-MM is calculated from a first read-out Markov model MM1 of a first installation module AM and from a second Markov model MM2 of a second installation module AM linked with the first installation module AM within the industrial installation, or a sub-installation TA linked with the first installation module AM within the industrial installation IA. Said Cartesian product K-MM indicates, for operating states of a combined sub-installation TA, which consists of the two linked installation modules AM or of the previous sub-installation TA linked with the first installation module AM, probabilities of the combined sub-installation TA being in different operating states, and the transition rates of state changes between the different operating states of the combined sub-installation TA.

In a further step S3, the calculated Cartesian product K-MM is subsequently reduced to a Markov model MINI of the combined sub-installation TA by those operating states of the calculated Cartesian product K-MM which have the same productivity P being combined to form an operating state.

The calculation of the Cartesian product K-MM in step S2 and the subsequent reduction thereof in step S3 are carried out progressively iteratively until the combined sub-installation TA forms the entire industrial installation IA. In this case, in step S2, it is also possible to form the Cartesian product of more than two Markov models simultaneously. With the method according to the invention, as is illustrated by way of example in FIG. 11, it is possible to carry out the calculation of a productivity P of the industrial installation IA with regard to one or more end products with high accuracy in an automated manner. In this case, a graphical RAM (Reliability Availability Maintainability) layout model of the industrial installation may serve as a basis, said model representing the products or end products and the dependencies of the installation modules AM within the industrial installation IA. Furthermore, it is possible to take account of characteristic Figures for each installation module AM, in particular a fault weight, an average outage time with own unplanned outages or failures of the installation module AM and restart times of the installation module AM depending on a duration of an outage caused by installation modules AM. The stored Markov models MINI describe the operating states of the different installation modules AM. When the installation modules AM are combined to form sub-installations TA, the Markov models MINI of the sub-installations TA are automatically generated or calculated. In this case, the set of states of the Markov model MINI for the sub-installation TA is firstly formed by the Cartesian product K-MM of the sets of states of the previous installation modules AM. In order that the number of states or operating states does not grow to an excessively great extent as a result of a practical implementation, after each combination of installation modules AM to form a sub-installation TA the number of operating states is reduced by differentiating only operating states having a different production level for the relevant sub-installation TA. This is achieved by calculating an equivalent Markov model MM or a reduced Markov model MM from only these operating states. In this case, the transition rate between two operating states having different productivity levels is preferably defined as a weighted sum of all original transition rates between the original operating states, which represent a transition from one productivity level to the other productivity level. In this case, the weighting factors can be formed by the failure probabilities for the original initial states. This leads to a Markov model MINI which calculates for the sub-installation TA the identical characteristic variables for the original Markov model MM, but has fewer operating states, and is thus suitable for the next combination with a further installation module AM or a further sub-installation TA.

In the case of Markov models MM of installation modules AM or sub-installations TA of which the entire industrial installation IA consists, the expected frequencies are indicated regarding how often a change is made between the different operating states of an installation module AM or of a sub-installation TA. It is thereby possible to take account of how, in particular, restart times of dependent sub-installations TA or installation modules AM affect the time proportions for the output levels or the total productivity of the industrial installation IA with regard to an end product. In this case, the Markov models MM are preferably designed in such a way that the number of operating states in the Markov model MM is limited to the number of operating states having a different output level or productivity P of the associated sub-installation TA, thereby avoiding an excessively rapid growth in the different operating states in the event of multiple linkage or combination of installation modules AM or sub-installations TA.

Figure 12:
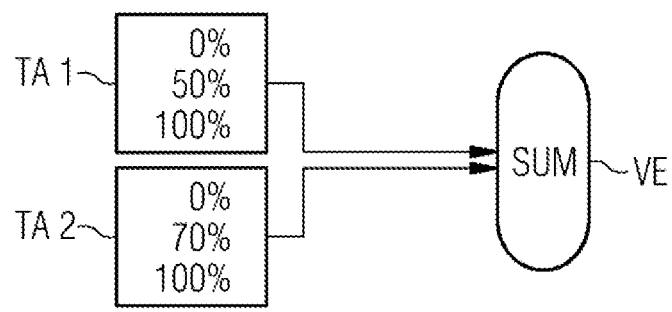
FIG. 12 shows a diagram for elucidating the functioning of the method and system for calculating a productivity of an industrial installation consisting of or including installation modules on the basis of a simple example.

FIG. 12 shows a simple scheme for illustrating an application example for the method according to the invention with which two sub-installations TA1, TA2 consisting of or including installation modules are linked by a summation linkage element VE to form a new sub-installation TA. In this case, output levels or productivities P of two (possibly aggregated) sub-installations TA or installation modules AM are added by means of the linkage element VE. In the simple application example illustrated in FIG. 12, the two sub-installations TA-1, TA-2 consist of a single installation module AM in the simple case. Furthermore, the two sub-installations TA-1, TA-2 can consist of installation modules AM or sub-installations already linked with one another. In the simple application example illustrated in FIG. 12, the first sub-installation TA-1 has three productivity levels or productivities P for three operating states, namely a productivity P=0% in the failed operating state, a productivity of P=50% in a further operating state, and a productivity of P=100% in a third operating state. In the same way, the second sub-installation TA-2 likewise has a productivity P=0% in a first, failed operating state, a productivity P=70% in a second operating state and a productivity P=100% in a third operating state. The use of Markov models MM makes it possible to take into account for each part of the installation or for each sub-installation TA how the respective sub-installation TA changes between the operating states and the different output levels or productivities P on account of failures and planned repairs. This is represented with the aid of a Markov model MM of the respective installation module AM or of the combined sub-installation TA.

Figures 13, 14:
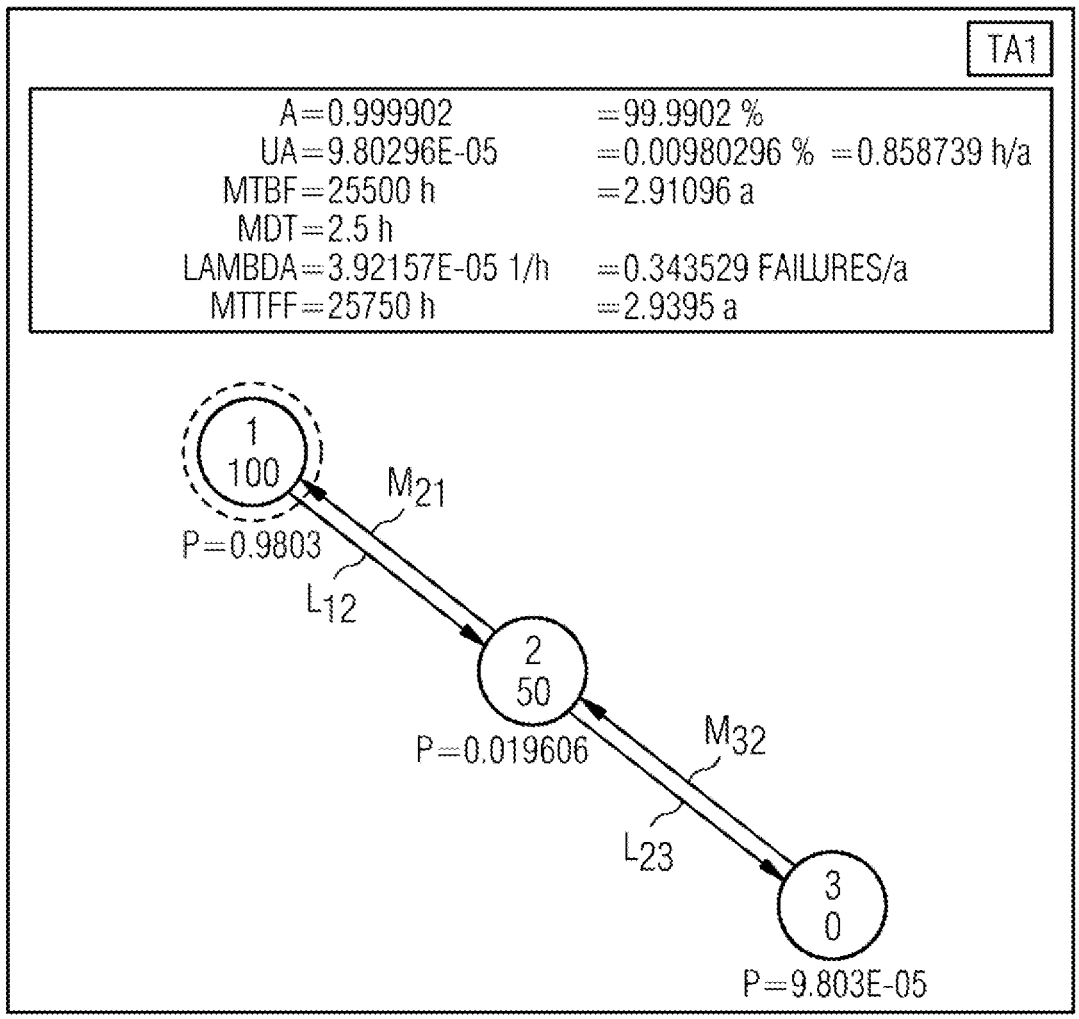
FIG. 13 shows a diagram for illustrating a Markov model for the application example illustrated in FIG. 12.
FIG. 14 shows a transition table for the Markov model illustrated in FIG. 13.

FIG. 13 schematically shows a Markov model MM-1 for the sub-installation TA-1 illustrated in FIG. 12 with the three operating states, having the productivities 100%, 50% and 0% with corresponding indications of probability. FIG. 14 shows a transition table associated with the Markov model MM-1 in FIG. 13 for the transitions between the three different operating states of the sub-installation TA-1.

Figures 15, 16:
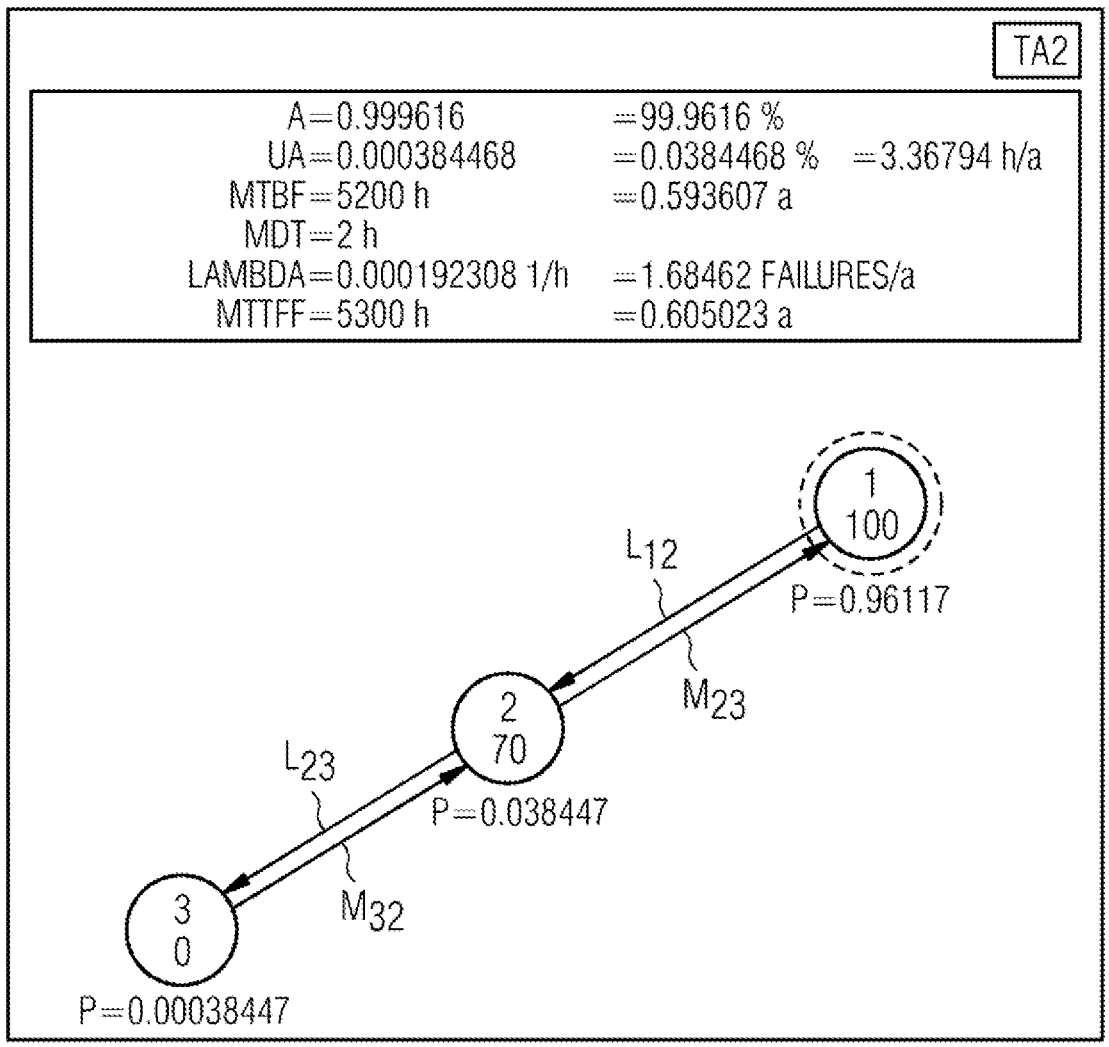
FIG. 15 shows a diagram of a further Markov model for the second installation module of the exemplary embodiment illustrated in FIG. 12.
FIG. 16 shows a transition table for the Markov model illustrated in FIG. 15.

FIG. 15 shows a Markov model MINI for the three different operating states of the second sub-installation TA-2 having a productivity of P=100%, 70% and 0%. FIG. 16 shows a transition table between the operating states that is associated with the Markov model MM of the sub-installation TA-2.

The transitions downward in FIGS. 13, 15 represent a (partial) failure L (loss), while transitions upward represent a repair M (maintenance).

In the sub-installations TA-1, TA-2 it is possible to determine from the Markov models MM the frequencies regarding how often a change is made for the different operating states with the corresponding output levels or productivities P. These frequencies can be used, in particular, to take account of effects of restart times WAZ of parts of the installation or sub-installations TA which are situated downstream within the industrial installation IA within a production chain. The calculation method according to the invention makes it possible, even for the aggregated part of the installation "sum of the output levels", which is formed with the aid of the summation linkage element VE and which contains the two sub-installations TA-1, TA-2, to enable such an analysis by automatically generating or calculating a new Markov model MINI from the two Markov models MINI of the two sub-installations TA-1, TA-2, said new Markov model on the one hand representing the part of the installation "sum of the output levels" with the two sub-installations TA-1 and TA-2 and on the other hand having only those operating states which describe the different output levels or productivities P, in order that the number of operating states does not grow excessively rapidly for the further calculation steps.

In the simple application example illustrated in FIG. 12, the two production levels or productivities P of the two sub-installations TA-1, TA-2 are summed. The calculation method according to the invention makes it possible to take account of the effects particularly of restart times WAZ of parts of the installation or sub-installations TA situated downstream in the industrial installation IA, by determining how often the "sum of the output levels" goes e.g. to the value zero or transitions without restriction to some other reduced output level.

Figure 17:
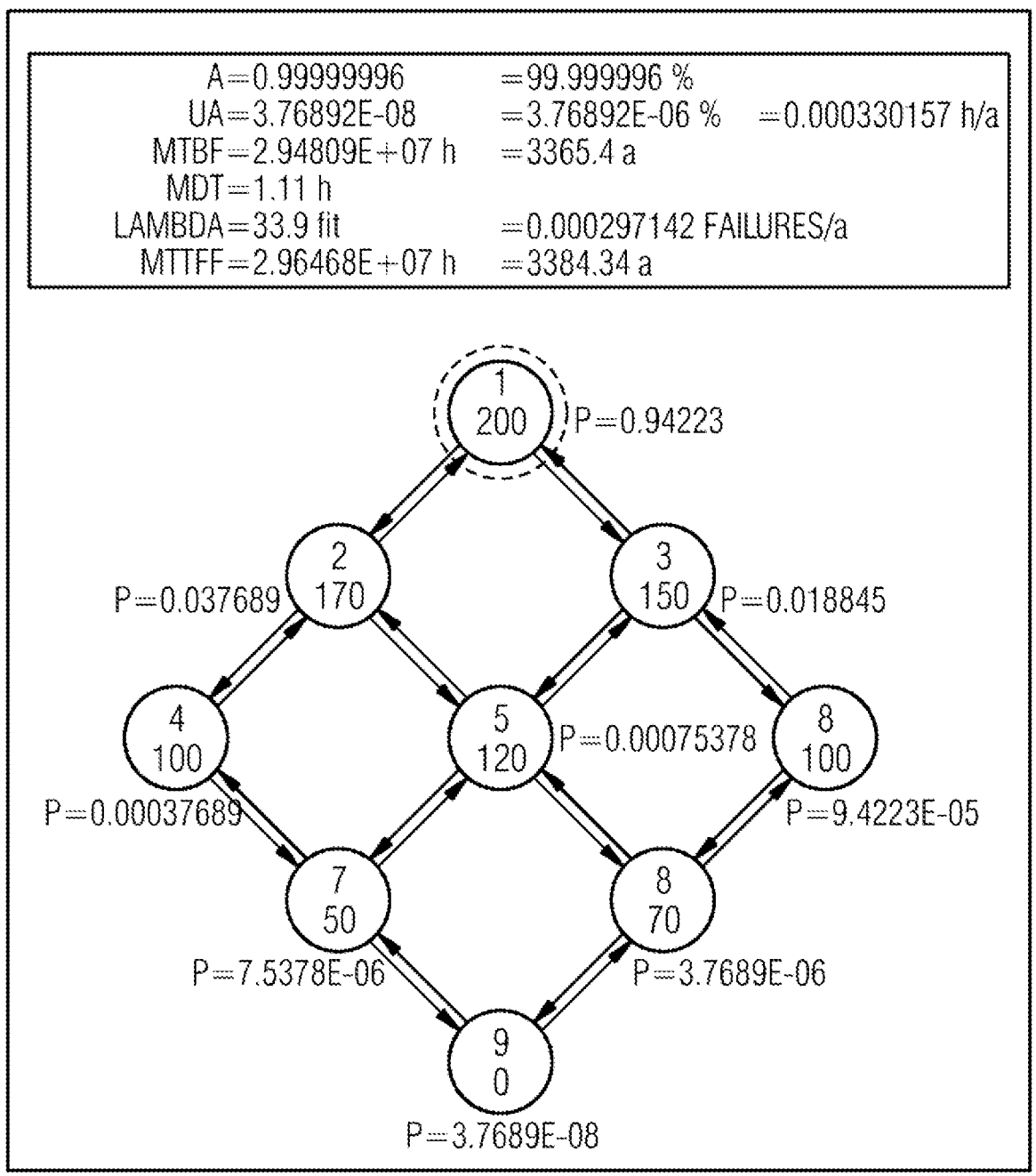
FIG. 17 shows a diagram of a Cartesian product—calculated from the two Markov models illustrated in FIGS. 13, 15—of a Markov model for elucidating the functioning of the method and system.
Figure 19:
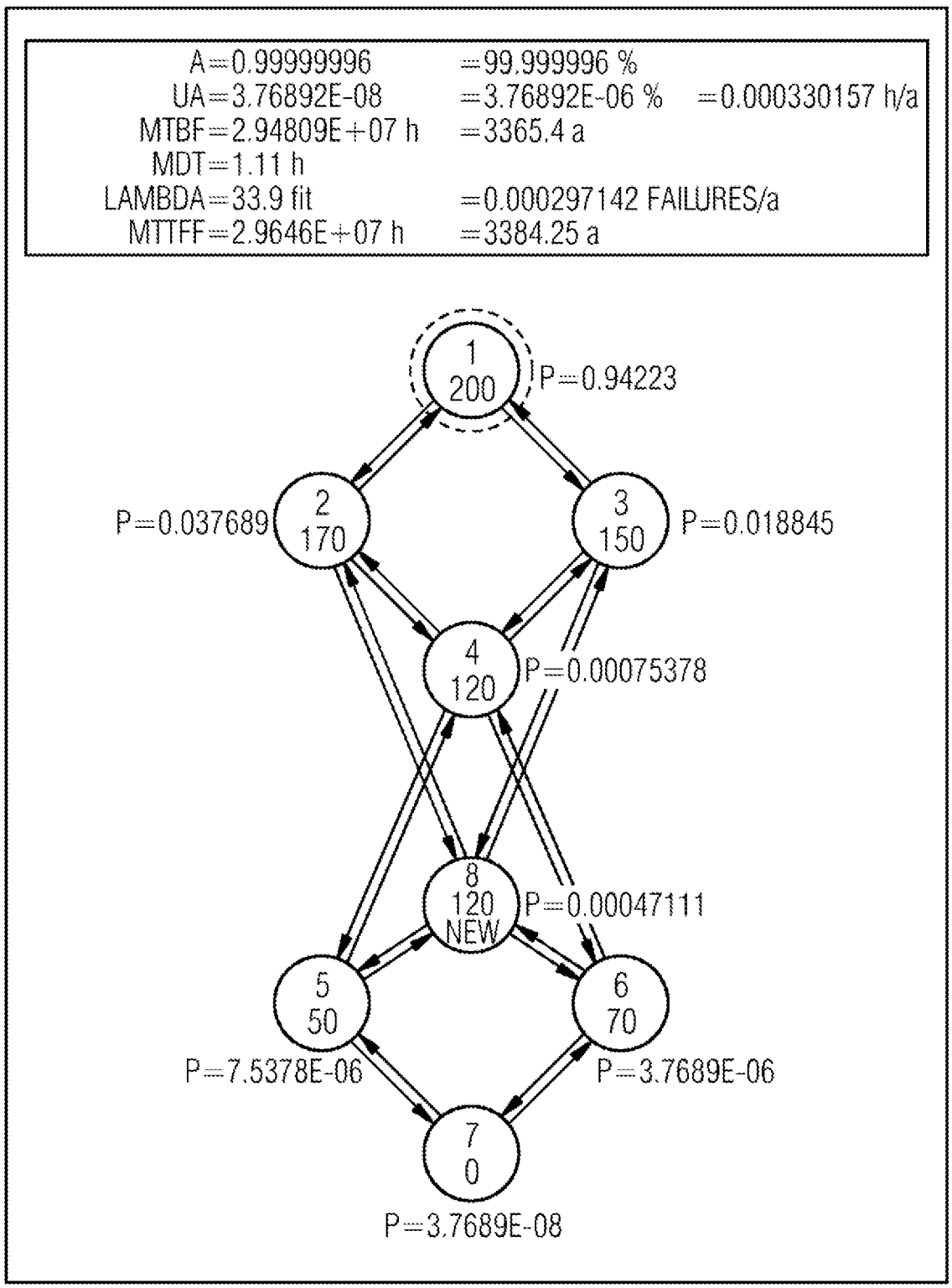
FIG. 19 shows a diagram for elucidating a reduction of the Cartesian product of a Markov model as illustrated in FIG. 18 to a reduced Markov model.

For this purpose, in a calculation step S2, the Cartesian product K-MM is calculated from the two Markov models MM1, MM2 of the two sub-installations TA-1, TA-2, as is illustrated in FIG. 17. FIG. 17 graphically shows a Cartesian product K-MM of the two Markov models MM illustrated in FIG. 13 and FIG. 15 with a total of nine operating states of the linked sub-installation assembled from the two sub-installations TA-1, TA-2. FIG. 18 shows a corresponding transition table between the operating states. In FIG. 17, a transition downward toward the right represents a failure (loss) in sub-installation TA-1, and a transition upward toward the left represents a repair M in sub-installation TA-1. Correspondingly, a transition downward toward the left represents a failure (loss) in sub-installation TA-2 and a transition upward toward the right represents a repair M in sub-installation TA-2. The Cartesian product K-MM of the two Markov models MM that is illustrated in FIG. 17 represents the output levels for the different operating states for the linked aggregated sub-installation consisting of or including the two sub-installations TA-1, TA-2. The calculated Cartesian product K-MM illustrated in FIG. 17 is subsequently reduced to a Markov model MM of the combined sub-installation TA by those operating states of the calculated Cartesian product K-MM which have the same productivity D being combined to form an operating state, as illustrated in FIG. 19. FIG. 20 shows a corresponding transition table for the reduced Markov model MM illustrated in FIG. 19. The Cartesian product K-MM of the two Markov models of the two sub-installations TA-1, TA-2 as illustrated in FIG. 17 indicates the residence probabilities for the different operating states with the different output levels or productivities P. These residence probabilities are used to design the desired reduced Markov model MM having only the operating states with different output levels or productivities P and the same steady-state solution, i.e. having the same frequencies for the changing between the operating states. This reduced Markov model MM is illustrated in FIG. 19. With the aid of the reduced Markov model MM is then possible again to calculate for downstream parts of the installation or sub-installations TA the frequency for restarting on account of the occurrence of states with output levels or productivities below a limit or a threshold value. If, in the application example illustrated, three days (72 hours), for example, are set for each start-up, then to a first approximation it is necessary to add 0.000297 times 72 hours to the 0.00033 hour per annum (output level 0% of the sum). This yields 0.0271 hour as average p.a. for an output level or a productivity P of 0% for the end product. This means that although the sub-installation "sum of the output levels", as illustrated schematically in FIG. 12, has a productivity or an output level of 0% only for 0.00033 hour per annum, as a result the end product is at an output level of 0% for 0.0271 hour per annum as an average. The ratio of the resulting availability values yields the so-called restart factor for the composite sub-installation TA in accordance with FIG. 12, which can be multiplied to the result for the end product, namely 99.999756%.

Overall, the influence of restarting can thus be disregarded in the application example illustrated.

Figure 21:
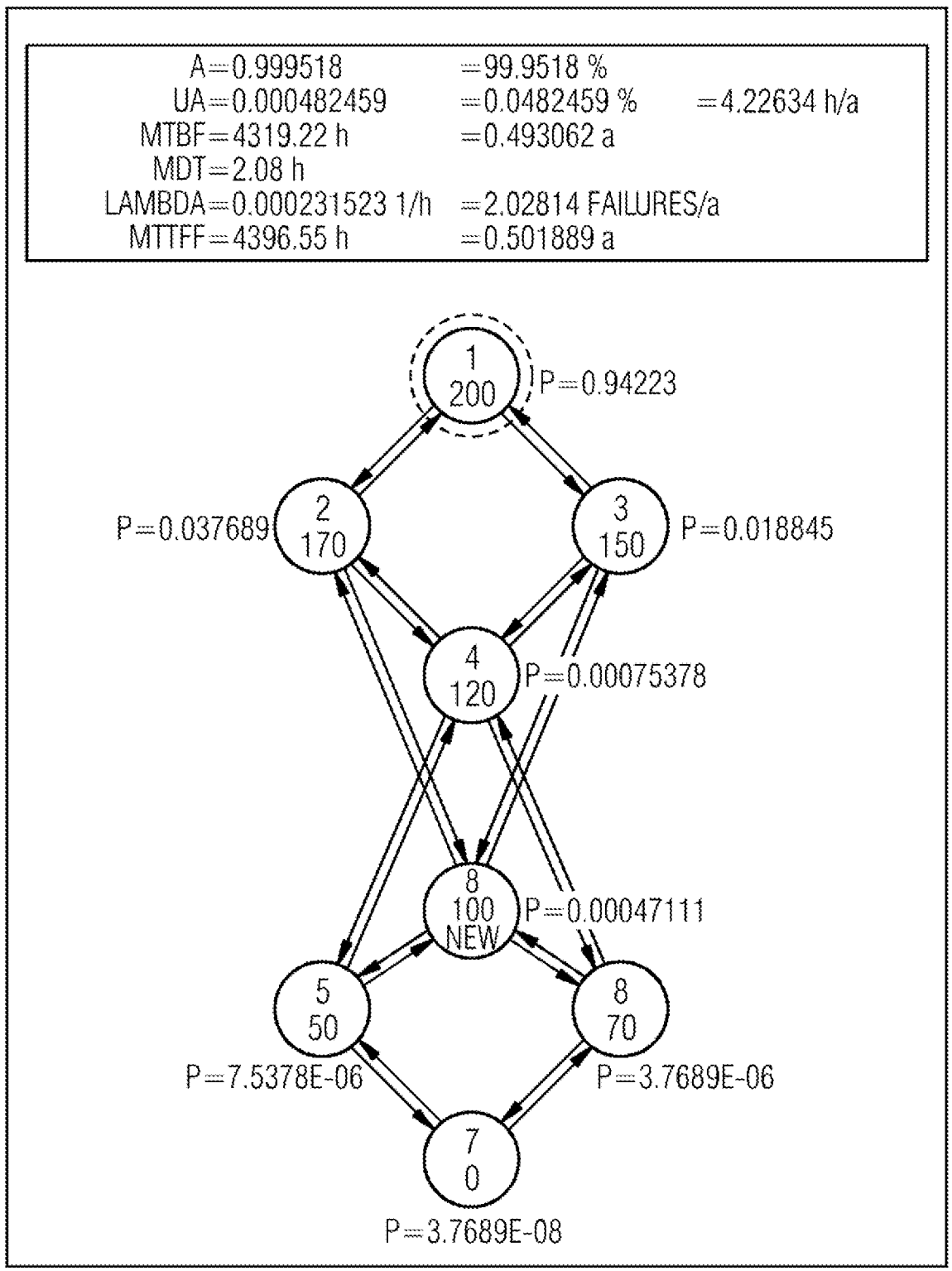
FIG. 21 shows a further diagram for illustrating a reduced Markov model.

If the limit for restarting the downstream sub-installation TA in the above application example is set to the output level or the productivity P of 100%, the associated Markov model MM, as is illustrated in FIG. 21, exhibits results which lead to a restart factor of 98.36%. In this case, the restart times WAZ within the industrial installation IA are no longer negligible. Instead of 4.22 hours per annum, the restarting results in failure times of 147.72 hours per annum when no end product is produced by the industrial installation IA. One possible scenario for such a limit or threshold of 100% would be, for example, that 100% of one sub-installation TA is already consumed for sustaining another downstream sub-installation TA, such that <100% for the second downstream sub-installation TA considered means a restarting.

FIG. 22 shows a transition table for the reduced Markov model MM illustrated in FIG. 21.

Figure 23:
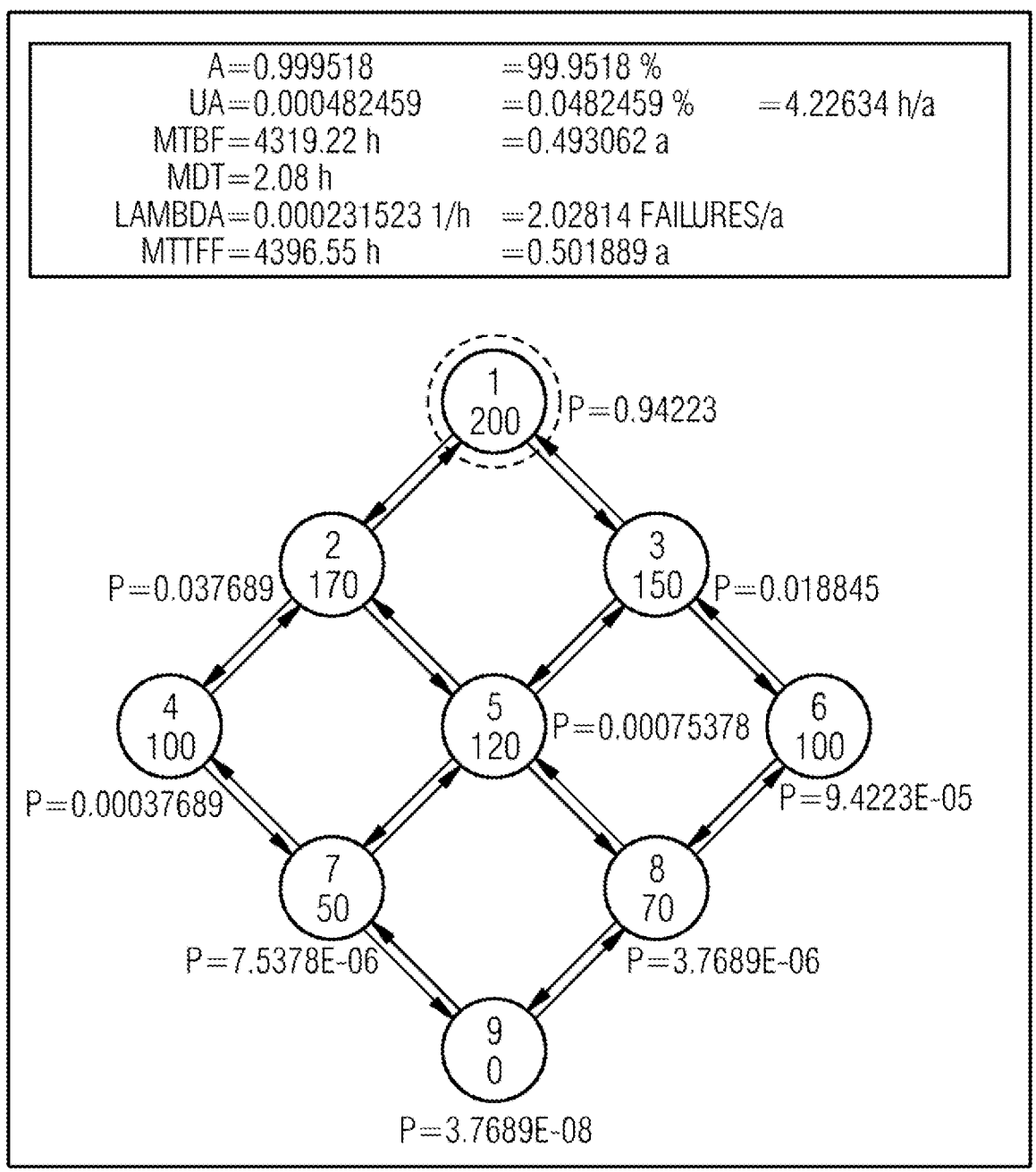
FIG. 23 shows a further diagram of a Markov model for elucidating the functioning of the method and system.
Figures 24, 25:
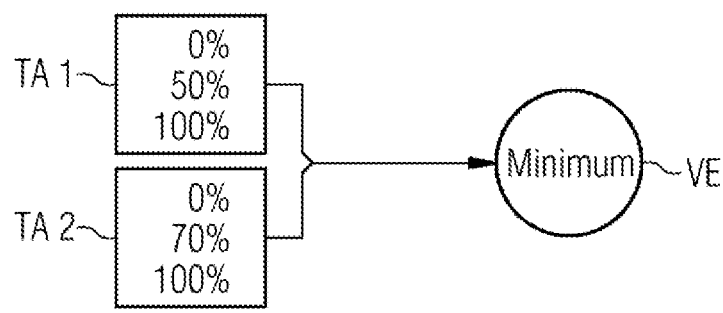
FIG. 24 shows a transition table for the Markov model illustrated in FIG. 23.
FIG. 25 shows a schematic illustration of a further application example for elucidating the functioning of the method and system.

FIG. 23 shows a corresponding explicit Markov model MM which as expected yields the same results. FIG. 24 shows a transition table for the Markov model MM illustrated in FIG. 23.

Figure 26:
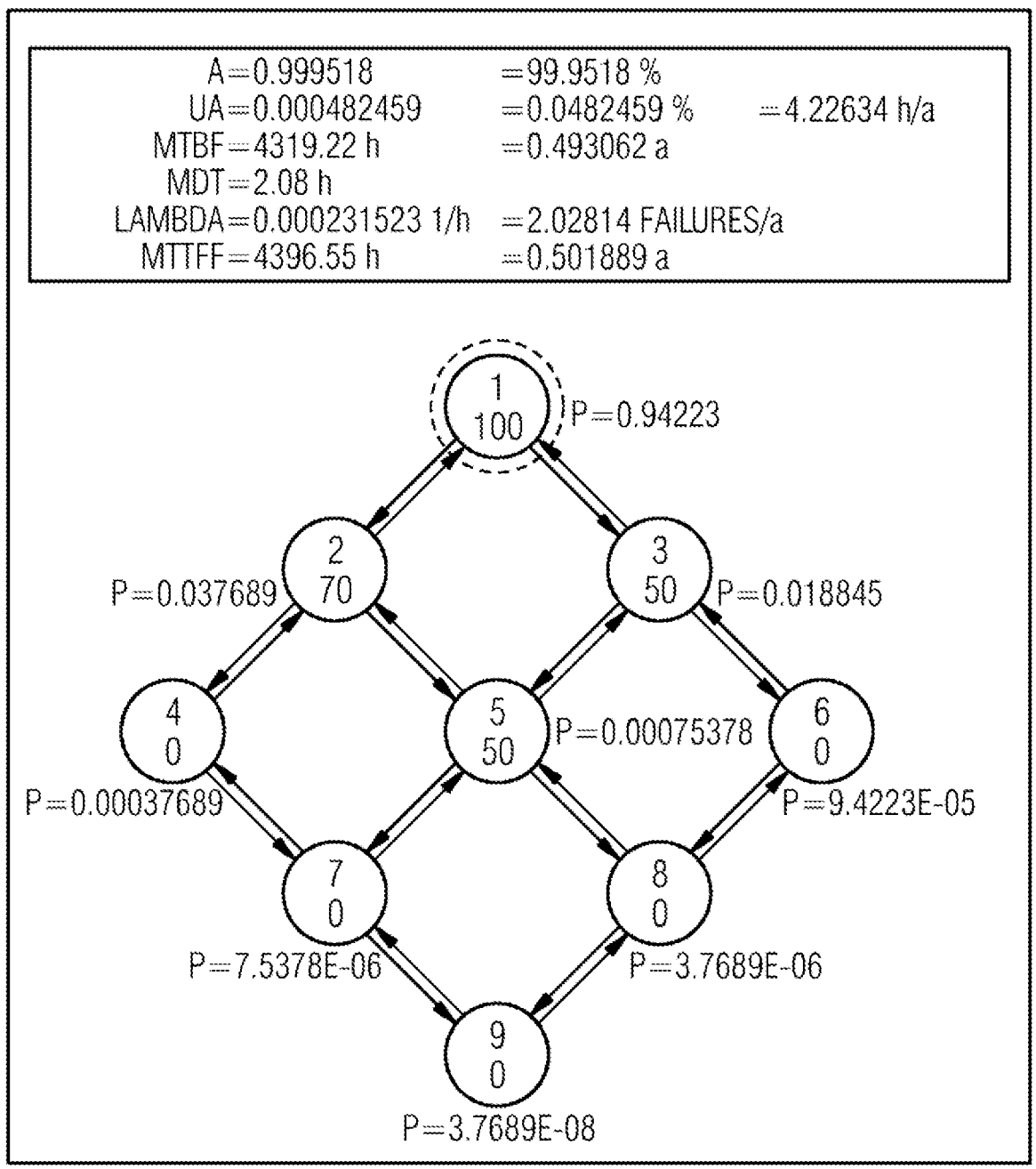
FIG. 26 shows a diagram for illustrating a Cartesian product of a Markov model for the two installation modules illustrated in FIG. 25, for elucidating the functioning of the method and system.

FIG. 25 schematically shows a further application example for elucidating the functioning of the method according to the invention. In this application example, the output levels or productivities P of two sub-installations TA-1, TA-2, which for their part are possibly already aggregated, are linked by a minimum linkage element VE, which uses the minimum of the two sub-installations TA-1, TA-2 as a result for the parts of the installation that are situated downstream within the industrial installation IA. The two linked sub-installations TA-1, TA-2 correspond to the sub-installations illustrated in FIG. 12. The representation and calculation for the linking minimum are carried out in a calculation step once again as a Cartesian product of the Markov models MM of the two sub-installations. FIG. 26 schematically shows the resultant Cartesian product K-MM of the two Markov models MM for the application in accordance with FIG. 25. FIG. 27 shows a transition table for transitions in the case of the Cartesian product of the two Markov models MINI that is illustrated in FIG. 26.

Figure 28:
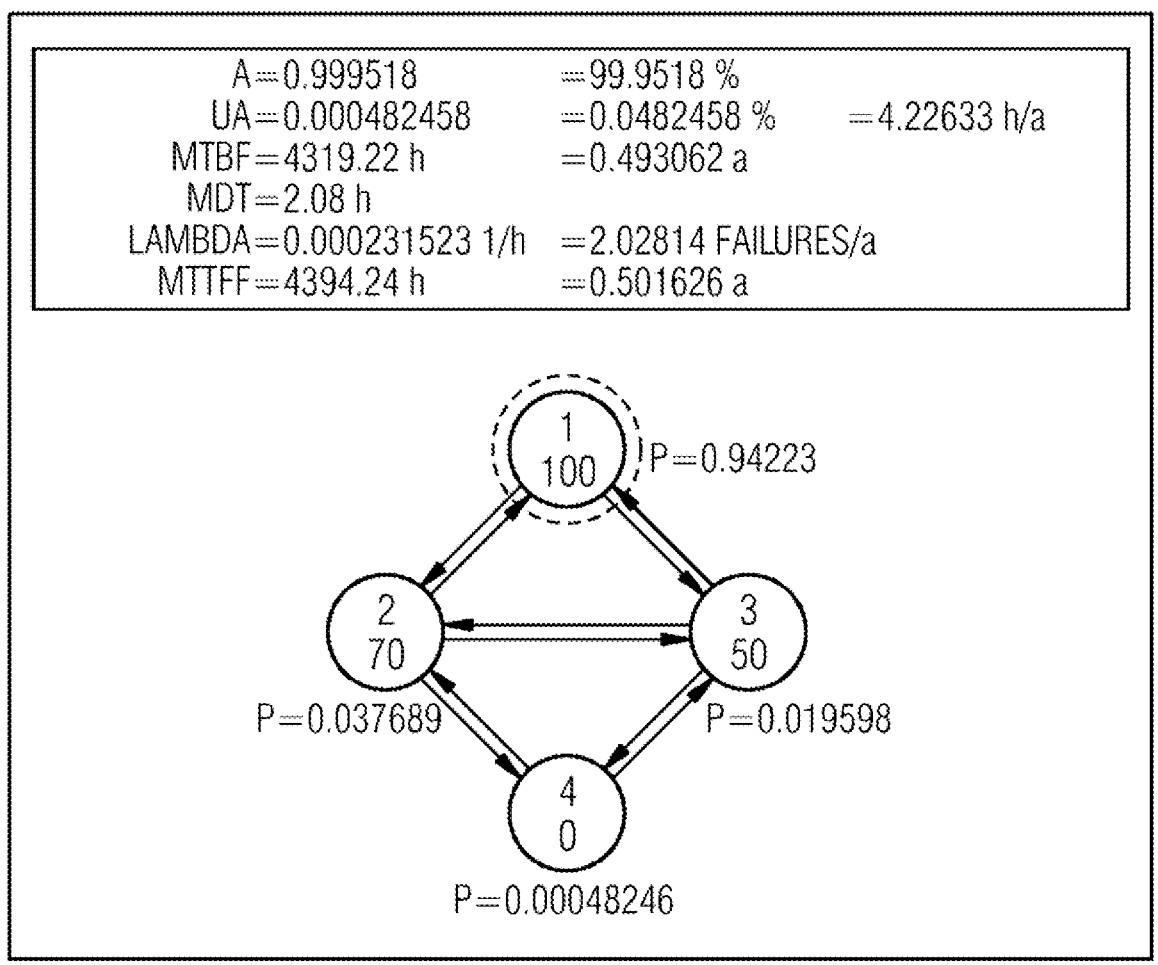
FIG. 28 shows a diagram for illustrating a reduced Markov model formed from the Markov model illustrated in FIG. 26.

In order to reduce the number of operating states for the further calculation steps, the illustrated example involves combining the operating states (3) and (5) for a 50% output level and all operating states with a 0% output level. This results in the reduced Markov model MINI illustrated in FIG. 28. FIG. 29 shows the transition table associated with FIG. 28.

As is evident from the examples illustrated, in the method according to the invention the number of operating states is significantly reduced by the reduction of the calculated Cartesian product K-MM. In the example specified, the original nine operating states of the Cartesian product of the two Markov models MM, as is illustrated in FIG. 26, are reduced to four operating states and the computational complexity in the iterative further calculation is thus significantly reduced. As a result of the reduction, the number of operating states is only of the same magnitude as the number of output levels or productivities P of the considered subsystem or part of the installation. A further advantage is that the effects of restart times WAZ can thereby be taken into account. If, in the given example, the same calculations as in the previous example are carried out for the restart factors, a restart factor of 98.36% is obtained for a limit or threshold of 0%. This restart factor is not negligible. Instead of 4.22 hours per annum, the restarting results in 147.72 hours per annum when the industrial installation IA does not yield or produce an end product.

Figure 30:
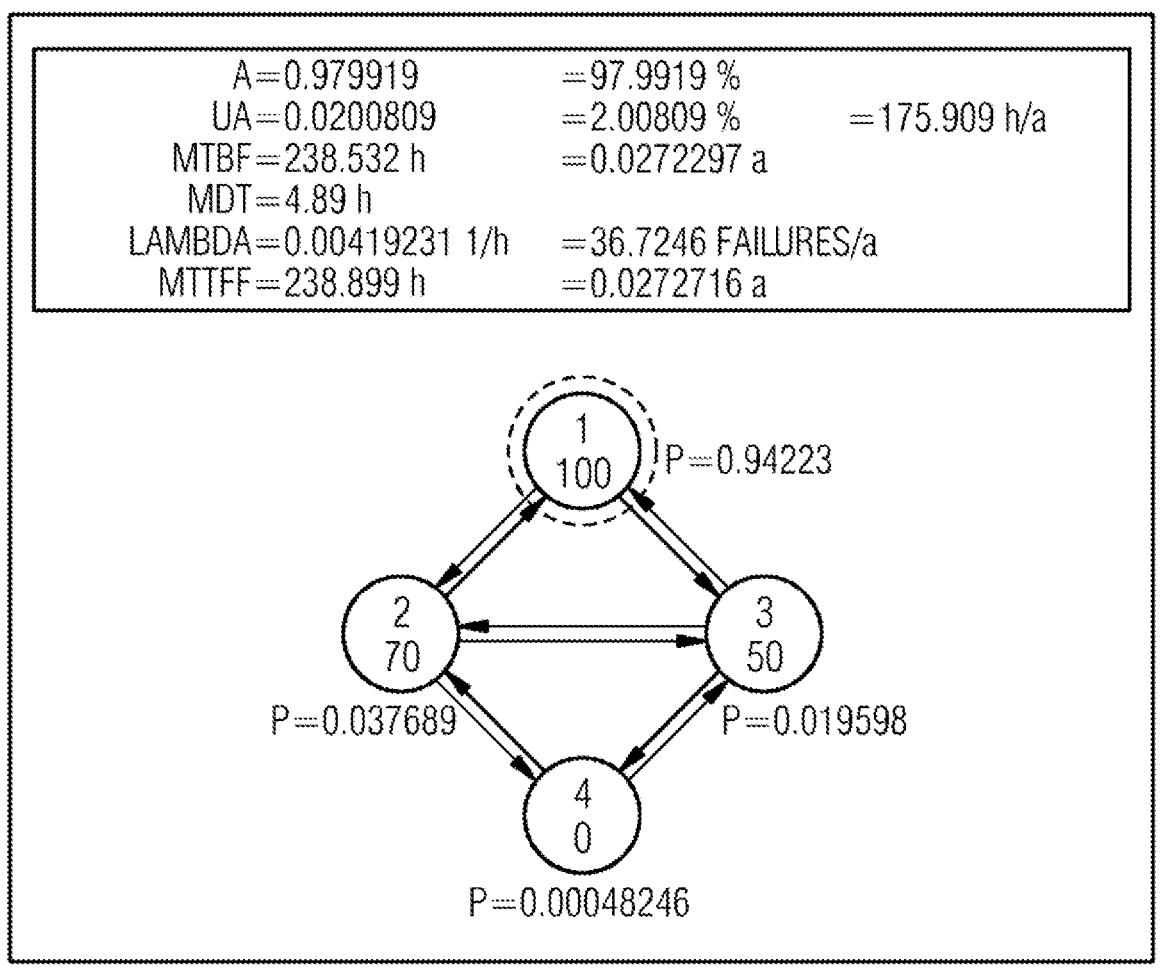
FIG. 30 shows a diagram for illustrating a reduced Markov model.

If all values below 70% lead to a shutdown and/or start-up with a restart time of 72 hours, this results in a reduced Markov model MM, as is illustrated in FIG. 30. FIG. 31 shows the transition table associated with the Markov model MM in accordance with FIG. 30. A restart factor having a value of 77.2% arises in this example. Instead of 176 hours per annum, therefore, no production of the end product by the industrial installation IA will take place for 2135 hours per annum on average on account of restart times. In this example, therefore, the influence of the restart times WAZ on the productivity of the overall installation IA is considerable or overwhelming.

In step S2 of the method according to the invention, as is illustrated schematically in FIG. 11, a Cartesian product is calculated from two Markov models MM. The Cartesian product of the two Markov models MM is calculated as follows:

Let there be a first Markov model $MM^1$
having states $Z_1=\{z_1^1, z_2^1, \ldots, z_{N_1}^1\}$ and
having transitions $\{t_{i,j}^1:z_i^1 \rightarrow z_j^1$ where $1 \leq i,j \leq N_1\}$
and a second Markov model $MM^2$
having states $Z_2=\{z_1^2, z_2^2, \ldots, z_{N_2}^2\}$ and
having transitions $\{t_{i,j}^2:z_i^2 \rightarrow z_j^2$ where $1 \leq i,j \leq N_2\}$
The Cartesian product K-MM of the two MMs is then defined as $MM^1 \times MM^2$
having states $Z=Z_1 \times Z_2$ and
having transitions $\{t_{i,j}^2:(z_k^1;z_i^2) \rightarrow (z_k^1;z_j^2)$ where $1 \leq i,j \leq N_2$ and $1 \leq k \leq N_1\}$ $\cup \{t_{i,j}^1:(z_i^1;z_k^2) \rightarrow (z_j^1;z_k^2)$ where $1 \leq i,j \leq N_1$ and $1 \leq k \leq N_2\}$ The states and transitions of the new MM are thus defined.

In step S3 of the method according to the invention, as illustrated in FIG. 11, the Markov model is reduced iteratively as follows:
1) Solving the MM that was designed as a Cartesian product. That comprises calculating the residence probabilities $p_j$ for the states j of the MM.
2) As long as there are two states i and l, which are combined to form a new state m, the following procedure should be adopted:
 a. the new residence probability $p_m$ is calculated by $p_m = p_i + p_j$.
 b. the transition rates between the new state m and the old states can thus be defined:
  i. In this case, the output rates from the new, combined state m are determined as follows:
   If there was a $t_{s,j}^{old}$ for $s \in \{i,l\}$ and the states i and l were combined to form the new state m, then $$t_{m,j}^{new} := \frac{p_s}{p_m} \cdot t_{s,j}^{old}$$

is calculated.
  ii. All the input rates into the new, combined state m can be adopted without change: if there was a $t_{j,s}^{old}$ for $s \in \{i,l\}$ and the states i and l were combined to form the new state m, then $t_{j,m}^{new} := t_{j,s}^{old}$ is calculated.
 c. The two combined states i and l can then be removed from the MM, including all their input and output transitions.
3) The reduced MM has resulted.

Figure 32:
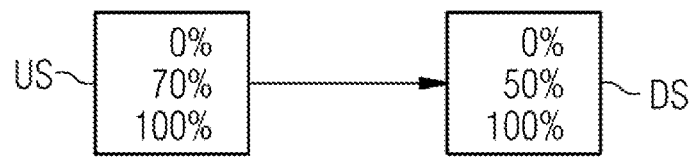
FIG. 32 shows a simple schematic illustration of one application example for elucidating the functioning of the method and system.

It is evident from the context of the application examples illustrated in FIG. 12 and FIG. 25 that the newly arisen combined sub-installations "sum" and "minimum" can be considered like a new combined sub-installation and can be used for further calculations or combinations. This is described below on the basis of a simple example in which the restart time WAZ of a sub-installation $TA_{DOWNSTREAM}$ connected downstream is taken into account because the latter is situated downstream of a sub-installation $TA_{UPSTREAM}$. In this example, the Markov model MM, as illustrated in connection with FIG. 32, is formed but the restart time WAZ of sub-installation $TA_{DOWNSTREAM}$ now has to be taken into account for a change that is connected from an output level 0% to 50% by the re-establishment of a line from sub-installation $TA_{UPSTREAM}$. This is preferably done by adding said restart time WAZ to the original reciprocal of the transition rate. In the Markov model "MINIMUM_EXPLICIT" this means that instead of the doubled repair rate of a line from sub-installation $TA_{UPSTREAM}$, that is to say instead of (2/MDT), it is now necessary to take [1/(MDT*0.5+restart time of $TA_{DOWNSTREAM}$)]. This results in an altered Markov model MM that takes account of the restart time WAZ of the downstream sub-installation $TA_{DOWNSTREAM}$.

Figure 33:
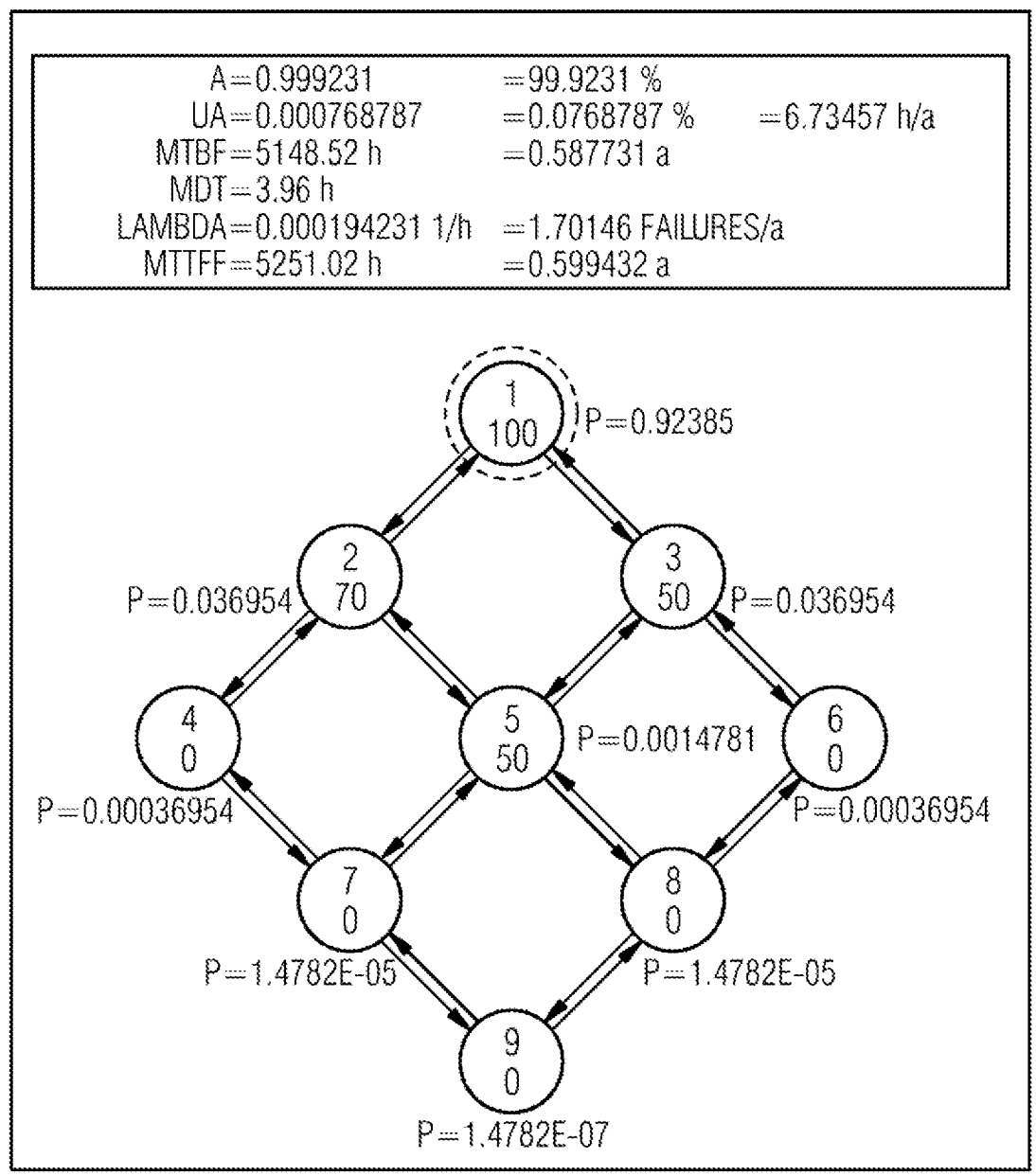
FIG. 33 shows a diagram for illustrating a Cartesian product of a Markov model for the application example illustrated in FIG. 32.

FIG. 33 shows the output model without restart times. FIG. 34 shows the associated transition table.

Figure 35:
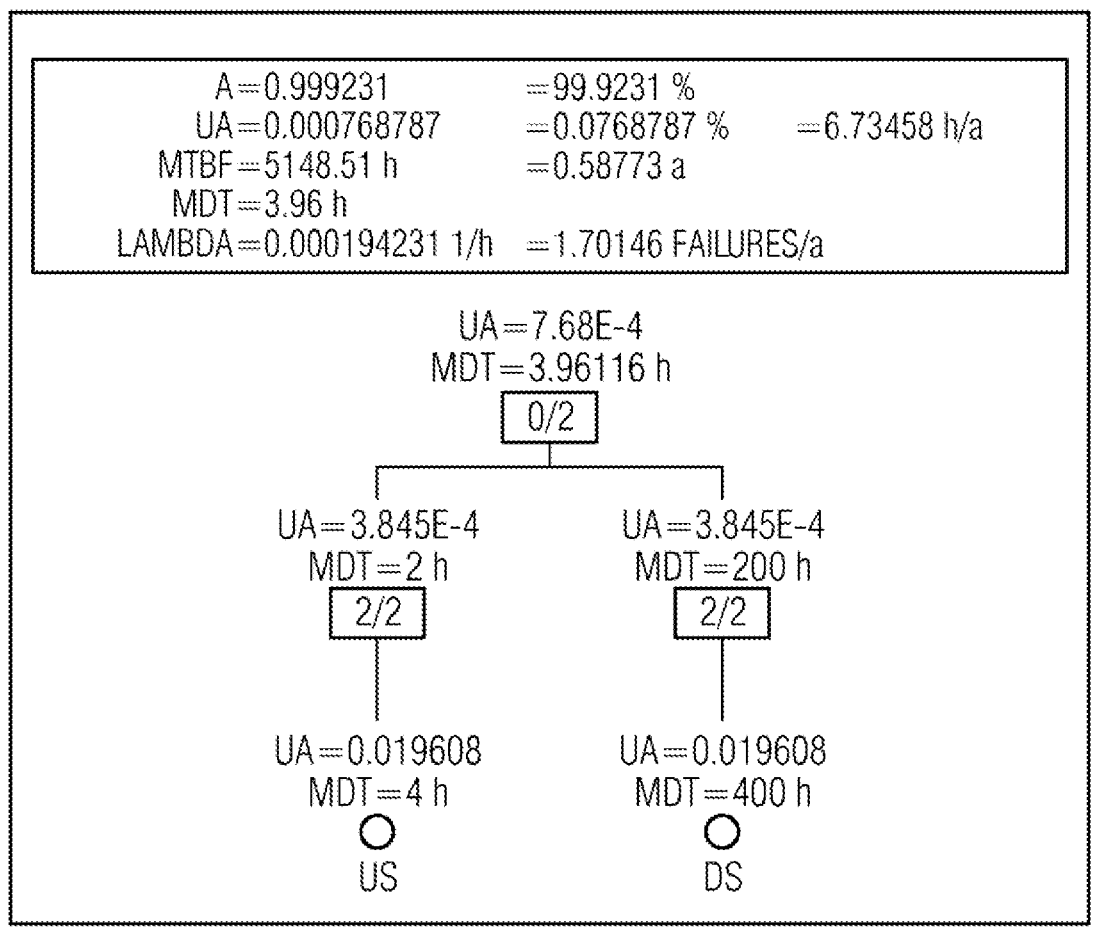
FIG. 35 shows a diagram for elucidating the functioning of the method and system.

The fault tree illustrated in FIG. 35 yields (apart from rounding errors), the same result as the Markov model MM in FIG. 33. However, the Markov model in accordance with FIG. 33 makes it possible to take account of restart times WAZ, as illustrated below. As an application example, for the lines downstream, the restart times from a production level of 0% to a production level of 70% shall be given as 200 hours and the restart time from a production level with a magnitude of 70% to a production level with a magnitude of 200% shall be given as 20 hours.

Thus, instead of the previous two hours for the transitions from operating state (3) to operating state (1), from operating state (5) to operating state (2) and from operating state (7) to operating state (4), now in each case 4+20=24 hours result. For the transitions from operating state (6) to operating state (3), from operating state (8) to operating state (5) and from operating state (9) to operating state (7), now in each case 2+200=202 hours result, instead of two hours previously.

Figure 36:
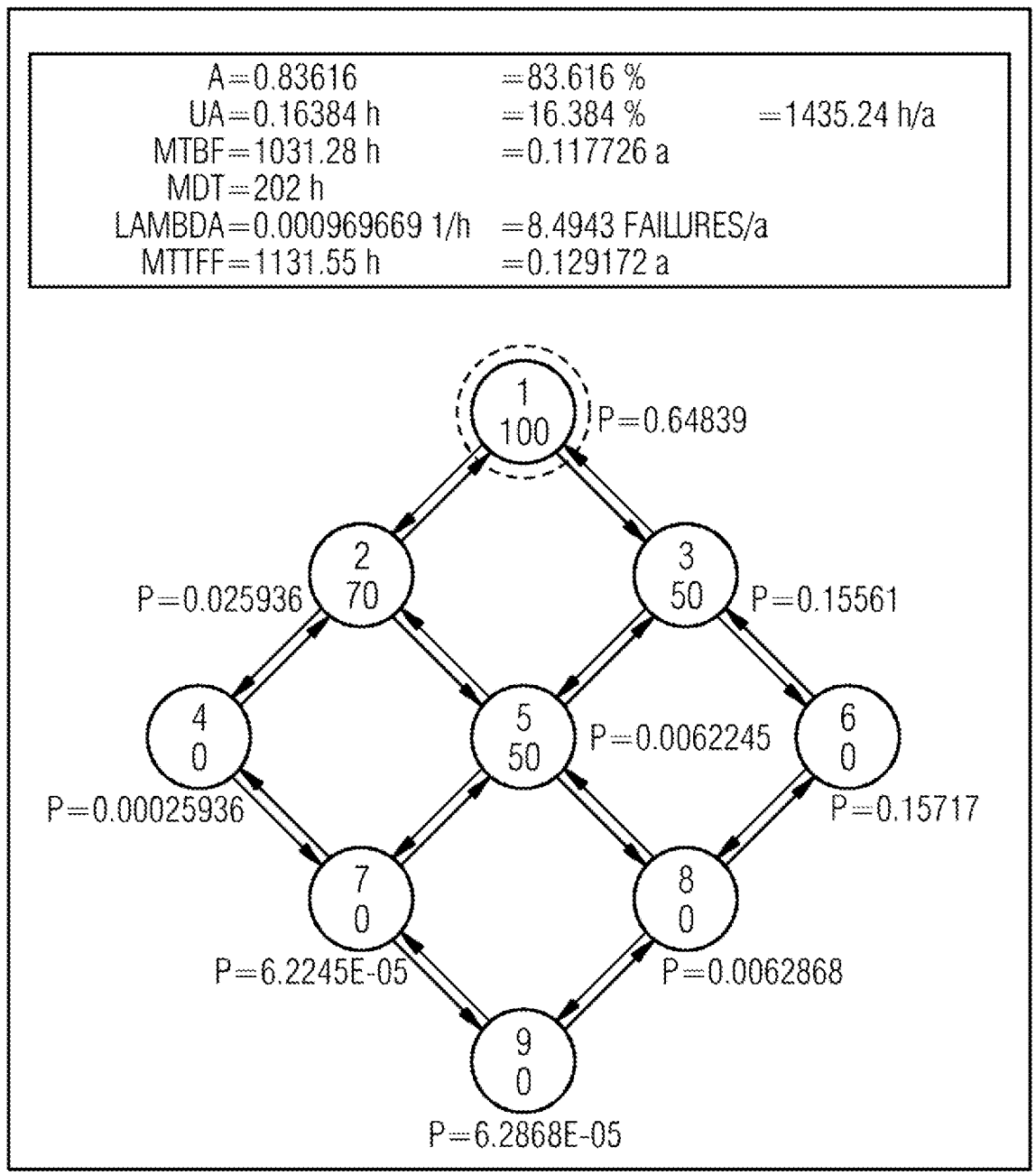
FIG. 36 shows a diagram for illustrating a Cartesian product of a Markov model for the application example illustrated in FIG. 35.

A Markov model thus results which takes account of the restart time and has the following characteristic Figures, as illustrated in FIG. 36. FIG. 37 shows the associated transition table.

It is evident that e.g. the time interval for 100% output level is reduced from originally 99.9231% to now 64.839% by the restart time of the sub-installation $TA_{DOWNSTREAM}$.

The planned outage times lead to different configurations. The outage times mean that different parts of a sub-installation are deactivated in a planned manner for a time segment and thus corresponding operating states with an associated production level or productivity are not possible and should be excluded in the Markov model MM. The results for each time segment, i.e. the time proportions for the different production levels in this time segment, should be summed in a weighted manner in accordance with the duration of the time segments. The calculated probabilities for the states of the Markov model MM are the time proportions for the different production levels or productivities P.

The invention claimed is:
1. A method for determining the productivity of an industrial installation including a plurality of installation modules:
 providing a computer system;
 forming a layout model of the industrial installation for the production of at least one end product, wherein the layout model includes the plurality of installation modules and linkage elements configured to produce the at least one end product;
 storing a Markov model for each of the plurality of installation modules on said computer system, said Markov model indicating, for operating states of the relevant installation module with a different productivity, probabilities of the relevant installation module being in the different operating states and transition rates of state changes between the operating states of the relevant installation module,
 calculating a Cartesian product from a first Markov model of a first installation module and from a second Markov model of a second installation module linked with the first installation module within the layout model of the industrial installation or of a sub-installation linked with the first installation module within the layout model of the industrial installation, said Cartesian product indicating, for operating states of a combined sub-installation including the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, carrying out progressively, the calculation of the Cartesian product and the subsequent reduction thereof until the sub-installation forms the entire layout model of the industrial installation such that the productivity of the industrial installation with respect to the at least one end product can be determined; and forming the physical industrial installation based on the layout model, calculations, and subsequent reductions.

2. The method as claimed in claim 1, wherein the installation modules and sub-installations in each case have a state time proportion distribution indicating for at least two discrete operating states of the respective installation module or of the respective sub-installation, the time proportion of an operating time during which the installation module or the sub-installation is in the respective operating state.

3. The method as claimed in claim 2, wherein a time proportion of an operating time in which an installation module or a sub-installation is in an inactive operating state comprises a planned time proportion, in particular for carrying out maintenance and repair measures on the respective installation module, and a time proportion caused by failure events, in particular for restarting the installation module or the sub-installation.

4. The method as claimed in claim 1, wherein the state time proportion distributions are linked by linkage elements, which are selected in accordance with a configuration of the industrial installation, to form the layout model of the industrial installation, wherein, on the basis of the generated layout model, the productivity of the industrial installation with regard to the at least one end product is calculated by a calculation unit.

5. The method as claimed in claim 4, wherein the state time proportion distributions of the selectable installation modules are read from a database to which the calculation unit has access.

6. The method as claimed in claim 1, wherein the time proportions indicated in the state time proportion distribution for the different operating states of the respective installation module are set depending on installation parameters and/or characteristic Figures of the respective installation module and/or depending on ambient parameters.

7. The method as claimed in claim 4, wherein the selectable linkage elements comprise arithmetic and/or logical linkage elements.

8. The method as claimed in claim 7, wherein one of the selectable linkage elements is formed by a combination linkage element, which generates, for each possible combination of operating states of upstream installation modules and/or sub-installations, a state time proportion distribution indicating, for each combined state, a productivity with regard to a product output by the upstream installation modules and/or sub-installations.

9. The method as claimed in claim 7, wherein one of the selectable linkage elements is formed by a minimization linkage element, which generates, for each possible combination of operating states of upstream installation modules and/or sub-installations, a state time proportion distribution indicating, for each combined state, the minimum of the productivities associated with the operating states with regard to a product output by the upstream installation modules and/or sub-installations.

10. The method as claimed in claim 1, wherein the installation modules and the linkage elements are linked with one another via linkage lines for generating the layout model of the industrial installation by a graphical editor.

11. The method as claimed in claim 1, wherein, for each end product of the industrial installation, a result state time proportion distribution is calculated which indicates, for each operating state of the entire industrial installation, a productivity with regard to the end product output by the industrial installation.

12. The method as claimed in claim 11, wherein the result state time proportion distributions of the different end products output by the industrial installation are weighted with the respective allocated value per produced quantity of the respective end product, wherein the total value of all the end products output by the industrial installation is maximized.

13. The method as claimed in claim 1, wherein the end products of the industrial installation comprise chemical and/or biochemical and/or pharmaceutical products and/or sensor data and/or electrical power.

14. A planning software tool having a computer readable hardware storage device having computer readable program code stored therein for planning an industrial installation, said program code having instructions carrying out a method for determining the productivity of an industrial installation including a plurality of installation modules:

providing a computer system;

forming a layout model of the industrial installation for the production of at least one end product, wherein the layout model includes the plurality of installation modules and linkage elements configured to produce the at least one end product;

storing a Markov model for each of the plurality of installation modules on said computer system, said Markov model indicating, for operating states of the relevant installation module with a different productivity, probabilities of the relevant installation module being in the different operating states and transition rates of state changes between the operating states of the relevant installation module, calculating a Cartesian product from a first Markov model of a first installation module and from a second Markov model of a second installation module linked with the first installation module within the layout model of the industrial installation or of a sub-installation linked with the first installation module within the layout model of the industrial installation, said Cartesian product indicating, for operating states of a combined sub-installation including the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, carrying out progressively, the calculation of the Cartesian product and the subsequent reduction thereof until the sub-installation forms the entire layout model of the industrial installation such that the productivity of the industrial installation with respect to the at least one end product is determined; and forming the physical industrial installation based on the layout model, calculations, and subsequent reductions.

15. A system for calculating a productivity of an industrial installation including a plurality of installation modules, comprising:

a database, in which a Markov model is stored for each of the plurality of installation modules, said Markov model indicating, for operating states of the relevant installation module with a different productivity, probabilities of the relevant installation module being in the different operating states and transition rates of state changes between the operating states of the relevant installation module, and which a layout model of the industrial installation is stored, wherein the layout model includes the plurality of installation modules and linkage elements configured to produce at least one end product; and a calculator, which calculates a Cartesian product from a first Markov model of a first installation module and from a second Markov model of a second installation module linked with the first installation module within the layout model of the industrial installation or of a sub-installation linked with the first installation module within the layout model of the industrial installation, said Cartesian product indicating, for operating states of a combined sub-installation including the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, wherein the calculation of the Cartesian product and the subsequent reduction thereof are carried out progressively until the combined sub-installation forms the entire industrial installation; and an output of the entire industrial installation indicating the productivity of the industrial installation with respect to the at least one end product.

16. An industrial installation comprising an installation controller which controls installation components of the industrial installation depending on productivities which are calculated with regard to end products of the industrial installation by a system for calculating a productivity of an industrial installation including a plurality of installation modules, comprising:

a database, in which a Markov model is stored for each of the plurality of installation modules, said Markov model indicating, for operating states of the relevant installation module with a different productivity, probabilities of the relevant installation module being in the different operating states and transition rates of state changes between the operating states of the relevant installation module, and which a layout model of the industrial installation is stored, wherein the layout model includes the plurality of installation modules and linkage elements configured to produce at least one end product and a calculator, which calculates a Cartesian product from a first Markov model of a first installation module and from a second Markov model of a second installation module linked with the first installation module within the layout model of the industrial installation or of a sub-installation linked with the first installation module within the layout model of the industrial installation, said Cartesian product indicating, for operating states of a combined sub-installation including the two linked installation modules or of the sub-installation linked with the first installation module, probabilities of the combined sub-installation being in different operating states and transition rates of state changes between the operating states of the combined sub-installation, wherein the calculated Cartesian product is subsequently reduced to a Markov model of the combined sub-installation by those operating states of the calculated Cartesian product which have the same productivity being combined to form one operating state, wherein the calculation of the Cartesian product and the subsequent reduction thereof are carried out progressively until the combined sub-installation forms the entire industrial installation; and an output of the entire industrial installation indicating the productivity of the industrial installation with respect to the at least one end product.

* * * * *